US006169934B1

(12) United States Patent
Nakayama et al.

(10) Patent No.: US 6,169,934 B1
(45) Date of Patent: Jan. 2, 2001

(54) WIRE HARNESS MANUFACTURING SYSTEM

(75) Inventors: Tsutomu Nakayama; Jiro Aikawa; Kouki Takeda, all of Shizuoka (JP)

(73) Assignee: Yazaki Corporation, Tokyo (JP)

(*) Notice: Under 35 U.S.C. 154(b), the term of this patent shall be extended for 0 days.

(21) Appl. No.: 09/267,347

(22) Filed: Mar. 15, 1999

(30) Foreign Application Priority Data

Mar. 16, 1998 (JP) ........................................ 10-065482

(51) Int. Cl.[7] ........................................ G06F 7/00

(52) U.S. Cl. ........................ 700/213; 700/95; 700/115; 700/116; 29/749; 29/755; 29/33 F; 29/857; 29/866; 29/867; 29/564.6; 29/564.1

(58) Field of Search ........................ 700/213, 95, 115, 700/116; 29/749, 755, 33 F, 33 M, 857, 866, 867, 564.6, 564.1

(56) References Cited

U.S. PATENT DOCUMENTS 4,641,428 * 2/1987 Anderson ........................ 29/863
4,653,159 * 3/1987 Henderson et al. ................ 29/33 M
4,677,734 * 7/1987 Bloch et al. .................... 29/564.2
4,701,007 * 10/1987 Jonca ........................... 385/147
4,727,637 * 3/1988 Buckwitz et al. ................ 29/407.04
4,742,612 * 5/1988 Dokan et al. .................... 29/739
4,782,273 * 11/1988 Moynagh ........................ 318/568.16
4,936,011 * 6/1990 Berry et al. ..................... 29/845
5,033,188 * 7/1991 Polliard et al. .................. 29/861
5,083,369 * 1/1992 Cerda ........................... 29/857
5,153,839 * 10/1992 Cross ......................... 364/468.19
5,208,977 * 5/1993 Ricard ........................... 29/861
5,249,120 * 9/1993 Foley ............................ 705/1
5,467,285 * 11/1995 Flinn et al. .................. 364/468.01
5,469,361 * 11/1995 Moyne ......................... 364/468.01
5,493,501 * 2/1996 Kondo ......................... 364/468.01
5,606,795 3/1997 Ohba et al. .
5,610,454 * 3/1997 Nishikawa et al. ................ 307/147
5,659,949 8/1997 Ohba et al. .
5,740,602 * 4/1998 Peterson et al. ................. 29/748
5,903,457 * 5/1999 Chang ......................... 364/468.01
5,987,743 * 11/1999 Yui ............................. 29/850

FOREIGN PATENT DOCUMENTS 6-223646 8/1994 (JP) .

* cited by examiner

*Primary Examiner*—Christopher P. Ellis
*Assistant Examiner*—Jeffrey A. Shapiro
(74) *Attorney, Agent, or Firm*—Armstrong, Westerman, Hattori, McLeland & Naughton

(57) ABSTRACT

A wire harness manufacturing system which issue a working instruction for manufacturing a wire harness to a worker using a network composed of an upstream network and a downstream network, comprising: a clamping pole having a plurality of wire clamps; a jig having a designating portion corresponding to each clamp; a first computer for managing data necessary to manufacture wire harnesses; a second computer for creating an operation instruction file; a third computer for checking the operation instruction file against a master file to create data available for all manufacturing steps; a fourth computer for allotting the file data processed by the third computer to each wire clamping pole, a server for supplying the operation instruction file data to the downstream network; a plurality of information terminal devices which are connected to the servers to requite data necessary for actual operations and provide each designation signal to said designating portion; and a scanner for supplying the number of the claiming pole to a certain information terminal device. In this wire harness manufacturing system, any beginner can manufacture the wire harness easily.

8 Claims, 27 Drawing Sheets

F I G. 2 6

| | | |
|---|---|---|
| PREPARATION | ▽ | FSP PROCESSING |
| CUTTING | ○ | CUTTING |
| | ○ | PEELING |
| ACCESSORY ATTACHING | ○ | ACCESSORY ATTACHING |
| CRIMPING | ○ | CRIMPING |
| | □ | CHECKING |
| | ○ | MARKING |
| JOINTING | ○ | JOINT CRIMPING |
| | □ | CHECKING |
| | ○ | JOINT TAPE WINDING |
| SUB-ASSY | ○ | SUB-ASSY |

FIG. 27

| | | |
|---|---|---|
| PREPARATION | ○ | OES PROCESSING |
| | ○ | INSTRUCTION CARD ISSUE |
| | ▽ | NEEDLE THREADING FOR INSTRUCTION CARD |
| | ▽ | INSTRUCTION CARD ALLOTMENT |
| CUTTING | ○ | CUTTING |
| | ▽ | ASSORTING |
| | ▽ | PEELING SET-UP |
| | ○ | PEELING |
| ACCESSORY ATTACHING | ▽ | ASSORTING |
| | ○ | ACCESSORY ATTATCHING |
| CRIMPING | ▽ | ASSORTING |
| | ▽ | A/P SET-UP |
| | ○ | CRIMPING |
| | □ | CHECKING |
| | ○ | MARKING |
| JOINTING | ▽ | JOINT ASSORTING |
| | ○ | JOINT "MIDDLE" PEELING |
| | ▽ | A/P SET-UP |
| | ○ | JOINT CRIMPING |
| | □ | CHECKING |
| | ○ | JOINT TAPE WINDING |
| ASSORTING | ▽ | ASSORTING (ITEM NUMBER SETTING) |
| SUB-ASSY | ○ | SUB-ASSY |

WIRE HARNESS MANUFACTURING SYSTEM

BACKGROUND OF THE INVENTION

1. Field of the Invention

The present invention relates to a wire harness manufacturing system which can give instructions to workers to manufacture a wire harness through a network.

2. Description of the Related Art

A conventional wire harness system, as shown in FIG. 27, includes steps of (1) preparation (set-up), (2) wire cutting, (3) combining of accessory, (4) terminal crimping, (5) wire jointing, (6) assorting, and (7) "sub-assy(assembly)".

The preparation step of (1) includes "OEF" processing, instruction outputting, instruction needle (metallic wire)-threading for an instruction card, and assorting of the instruction cards.

The OES (Order Entry System) is a method of batch-producing sub-wire harnesses in accordance with job or task instructions. The batch production is to cut a single electric wire into a number of wire segments each having a predetermined length within a single lot and successively crimp the same terminal on each wire to manufacture the electric wires each equipped with the same terminal in lots. The OES refers to inputting processing for this purpose. The instruction outputting is to issue an instruction card on the basis of the OES processing. The instruction cards each with a needle-threaded tied to a product is sequentially transferred to each manufacturing step. In the instruction assorting step, the instruction cards are assorted in accordance with sizes of products.

The step (2) of wire cutting includes "cutting", "assorting", "peeling preparation", and "peeling".

Specifically, in this step, an electric wire is cutting into segments each having equal lengths, The wire segments (simply referred to as "wires") are assorted in terms of a peeling length, peeling position, etc. Using a peeling machine adjusted in accordance with the peeling length, the insulating covering of each wire is peeled at its end position or middle position.

The step (3) of accessory combining includes "assorting" and "combining of accessory".

Specifically, the wires are assorted in accordance with a kind of accessory, and they are combined with the same accessory.

The step (4) of "terminal crimping" includes "assorting", "A/P (applicator) preparation", "crimping", "testing", and "marking".

In this step, the wires are assorted in accordance with the kind of a terminal. The A/P preparation is to replace an A/P (applicator) in accordance with a terminal crimping machine and adjust a crimping height. The A/P includes an up-and-down upper die (crimper) and fixed lower die (anvil). After the end of the wire is crimped with a terminal, the crimping state is tested by naked eyes or a television camera, and the terminals are marked with marks for identification in the terminal insertion step described above.

The step (5) of wire jointing includes "joint assorting", "joint peeling", "A/P preparation", "joint crimping", "testing" and "joint tape winding".

The wires each equipped with the terminal in the step of (4) are assorted in accordance with the kind of a joint terminal or joint position. The insulating covering at the middle portion of the wire is peeled using a peeling machine.

In the same manner as the terminal crimping, the A/P for the joint crimping machine is prepared in accordance with the joint terminal. The terminal of another wire is branch-connected to the peeling position of the wire at issue through the joint terminal. After the crimping state is tested, the joint portion is wound by an insulating vinyl tape.

The step (6) of assorting is to set the terminal-crimped wires and jointed wires for each product number.

The step (7) of "sub-assy" is to insert the terminal of each wire in a connector housing, thereby assembling a sub-assy (sub-wire harness).

The sub-assys are arranged in the form of a wire harness on a wire harness board, and subjected to a protector combining and a tape winding to complete a wire harness.

The manufacturing system described above does not suffer from the problem when the sub-assembles with the same product (item) number are mass-produced. However, this system requires a large number of tooling changes (replacement of preparation or set-up) in flexible manufacturing (a small amount and a wide variety of products). This leads to poor efficiency and a longer time of work. A worker is required to have knowledge of the wide variety of products, and higher skill.

Particularly, in recent years, manufacturing locations of wire harnesses for Japanese motor vehicles have been shifted to overseas factories. The mass-produced products are preferentially shifted, whereas the percentage of the non-mass-produced products is increasing performed in Japanese. Therefore, it is important to manufacture the non-mass produced products effectively. Further, the strategy of a car maker moving abroad has developed the localized production of motor vehicles. Therefore, the production of the non-mass-produced products is increasing in overseas factories for wire harnesses.

SUMMARY OF THE INVENTION

An object of the present invention is provide a wire harness manufacturing system which permits any person to carry out flexible production of wire harnesses effectively.

More specifically, an object of the present invention is to a wire harness manufacturing system which can satisfy the requirements of (1) shortening the lead time to enable the production by a firm order (final order from a car maker), (2) reduce attendant works to increase the production efficiency, (3) improve a work instructing method to enable any person to carry out the work easily, and (4) improve the efficiency of work preparation to prevent the analysis processing in an indirect department from increasing.

In order to attain the above object, there is provided a wire harness manufacturing system which issue a working instruction for manufacturing a wire harness to a worker using a network composed of an upstream network and a downstream network, comprising: a plurality of wire clamping poles each having a plurality of wire clamps; a jig having a designating portion corresponding to each clamp; a first computer for managing data necessary to manufacture wire harnesses; a second computer for supplying the data received from the first computer with several kinds of designation data to create an operation instruction file; a third computer for checking the operation instruction file against a master file to create a data file available for all manufacturing steps; a fourth computer for allotting file data processed by the third computer to each wire clamping pole, a plurality of servers for supplying the file data to the downstream network; a plurality of information terminal devices which are connected to the servers to requite data necessary for actual operations and provide each designation signal to the designating portion; and a scanner connected to each of said information terminal devices, for supplying the number of the claiming pole to a certain information terminal device , wherein said first, second, third and fourth computers are connected to the server through a bus line and constitute the upstream network. In this configuration of the wire harness manufacturing system, data necessary to manufacture a wire harness are distributed to each information terminal device from an upstream network through a server. The item number of the wire clamping pole is read to designate a wire to be used in the wire clamping pole. Each information terminal device issues an instruction of the task to be effected by a worker. If the worker effects the task in accordance with the instruction, he can carry out flexible production of a sub-wire harness easily and flexibly with no skill.

The above and other objects and features of the present invention will be more apparent from the following description taken in conjunction with the accompanying drawings.

BRIEF DESCRIPTION OF THE DRAWINGS

FIG. 26 is a table showing the summary of an FPS system; and

FIG. 27 is a table showing the summary of a conventional system (OES).

DESCRIPTION OF THE PREFERRED EMBODIMENTS

Figure 1:
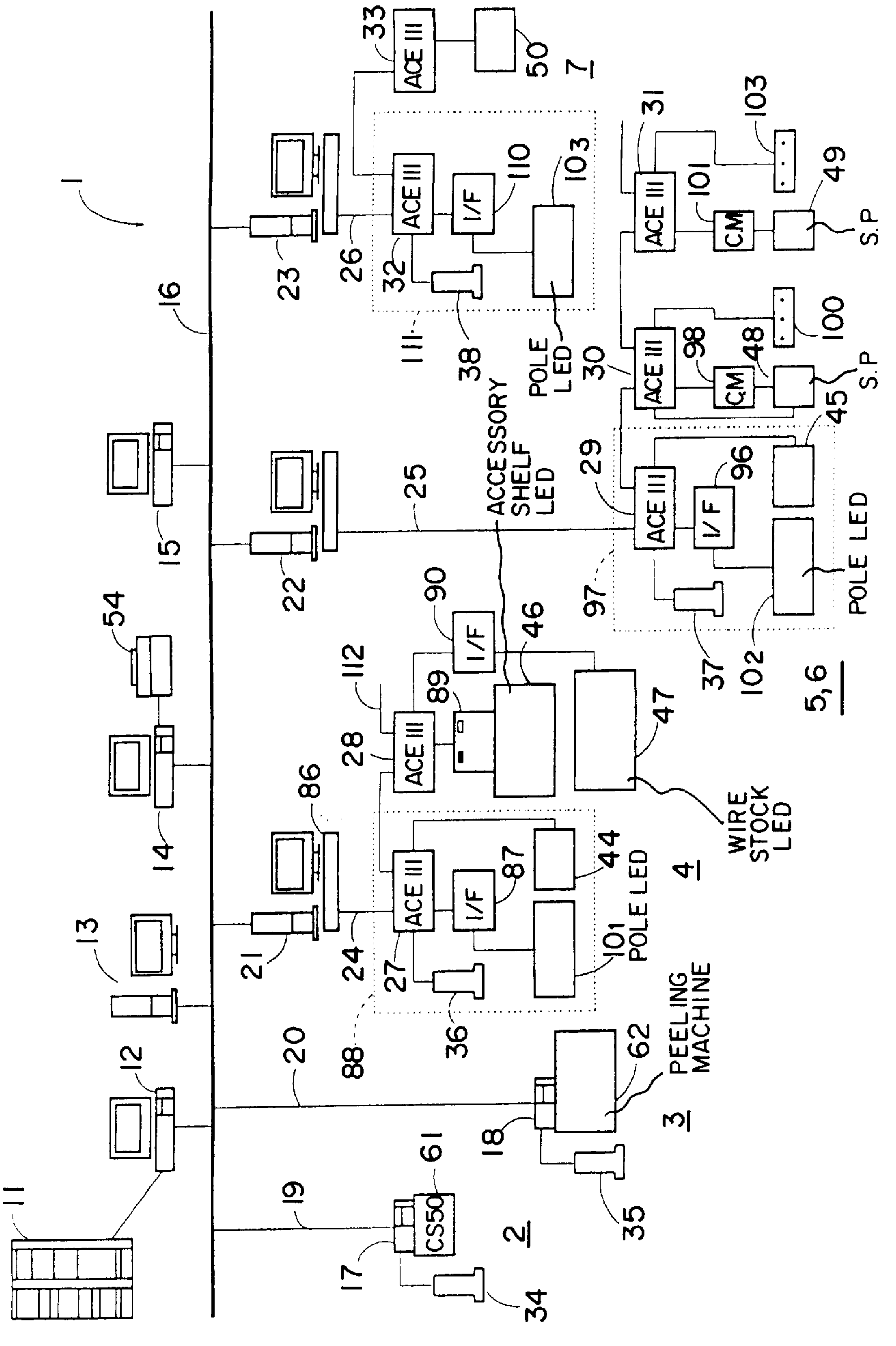
FIG. 1 is a system diagram showing an embodiment of a wire harness manufacturing system according to the present invention.

Now referring to the drawings, an explanation will be given of embodiments of the present invention.

FIGS. 1 to 14 show an embodiment of a wire harness manufacturing system according to the present invention.

Figure 2:
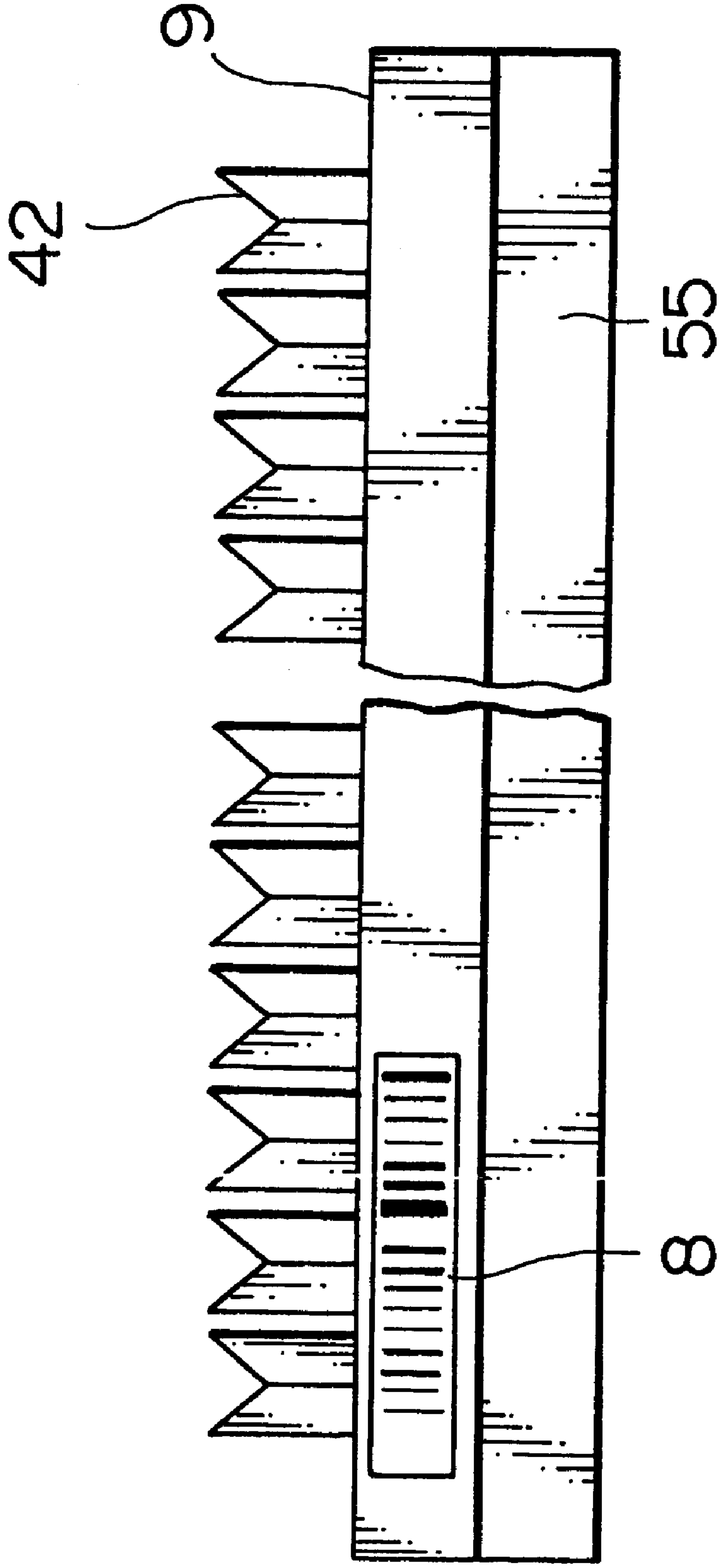
FIG. 2 is a front view of a wire clamping pole.

Through a network as shown in FIG. 1, this manufacturing system transmit manufacturing instruction data according to product (item) numbers of sub-wire harness for each of steps of cutting 2, peeling 3, accessory combining 4, terminal crimping 5, wire jointing 6 and terminal inserting so that works to be done are instructed to workers using a wire clamping pole 9 having a bar code (identifying portion) 8 as shown in FIG. 2, a wire clamp position designating jig (pole LED) in which the wire clamping pole 9 is set, etc., and automatic setup for a terminal crimping machine can be made.

As shown in FIG. 2, the wire clamping pole 9 is composed of a lengthy straight base plate 55 of aluminum and clamps 42 of synthetic resin arranged at regular intervals on the base plate 55. Such a wire clamping pole 9 has been used as a wire harness manufacturing jig. A bar code seal 8 is pasted on the base plate 55. The clamp 42 is composed of a pair of sandwiching members spring-urged in a closing direction between which a wire can be inserted or implanted by a hand from above. Another identifying means can be used in place of the bar code 9, and another reading means such as a television camera can be used in place of a bar code scanner 36 in FIG. 1.

Figure 3:
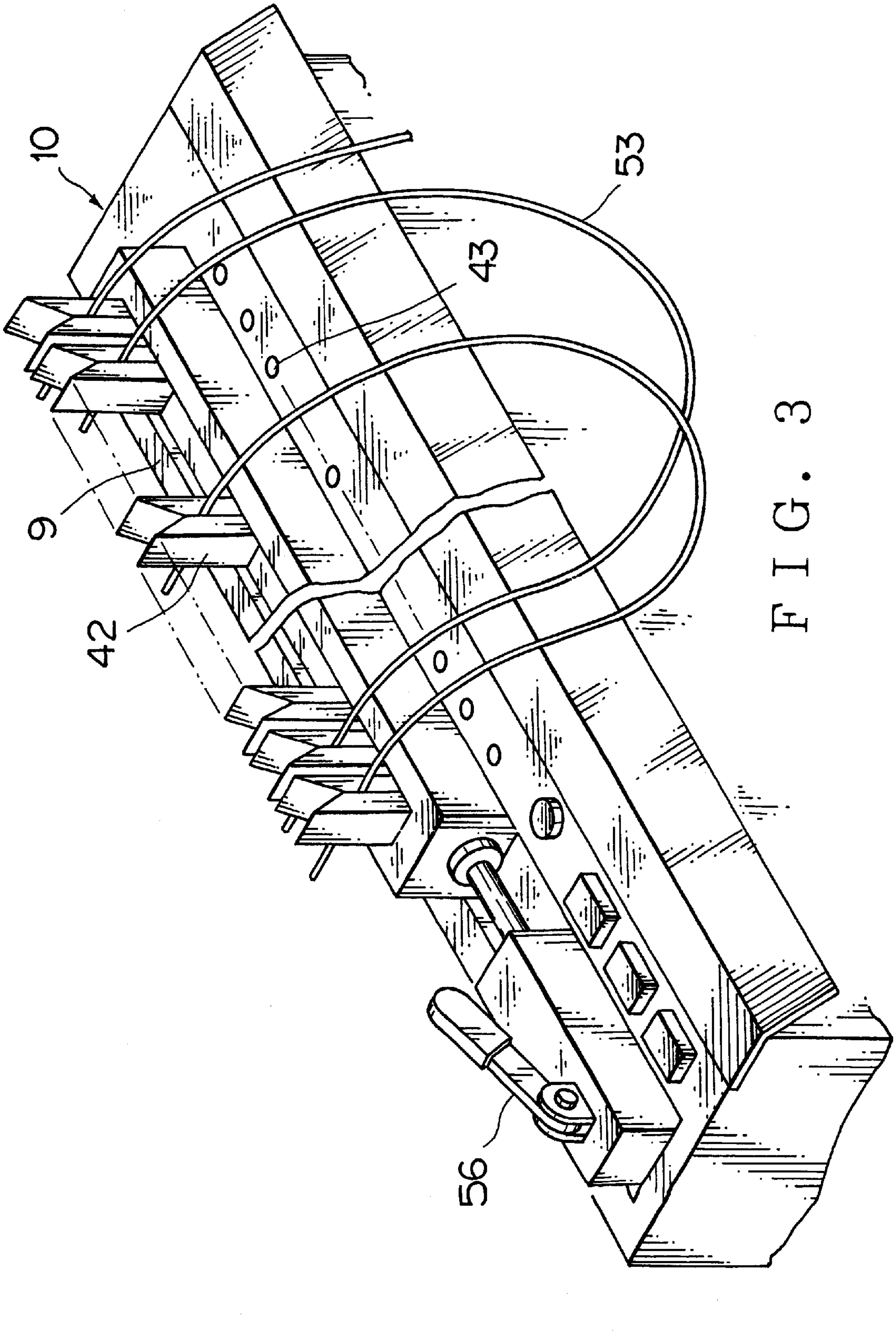
FIG. 3 is a perspective view of a jig for designating a wire clamp position.
Figure 4:
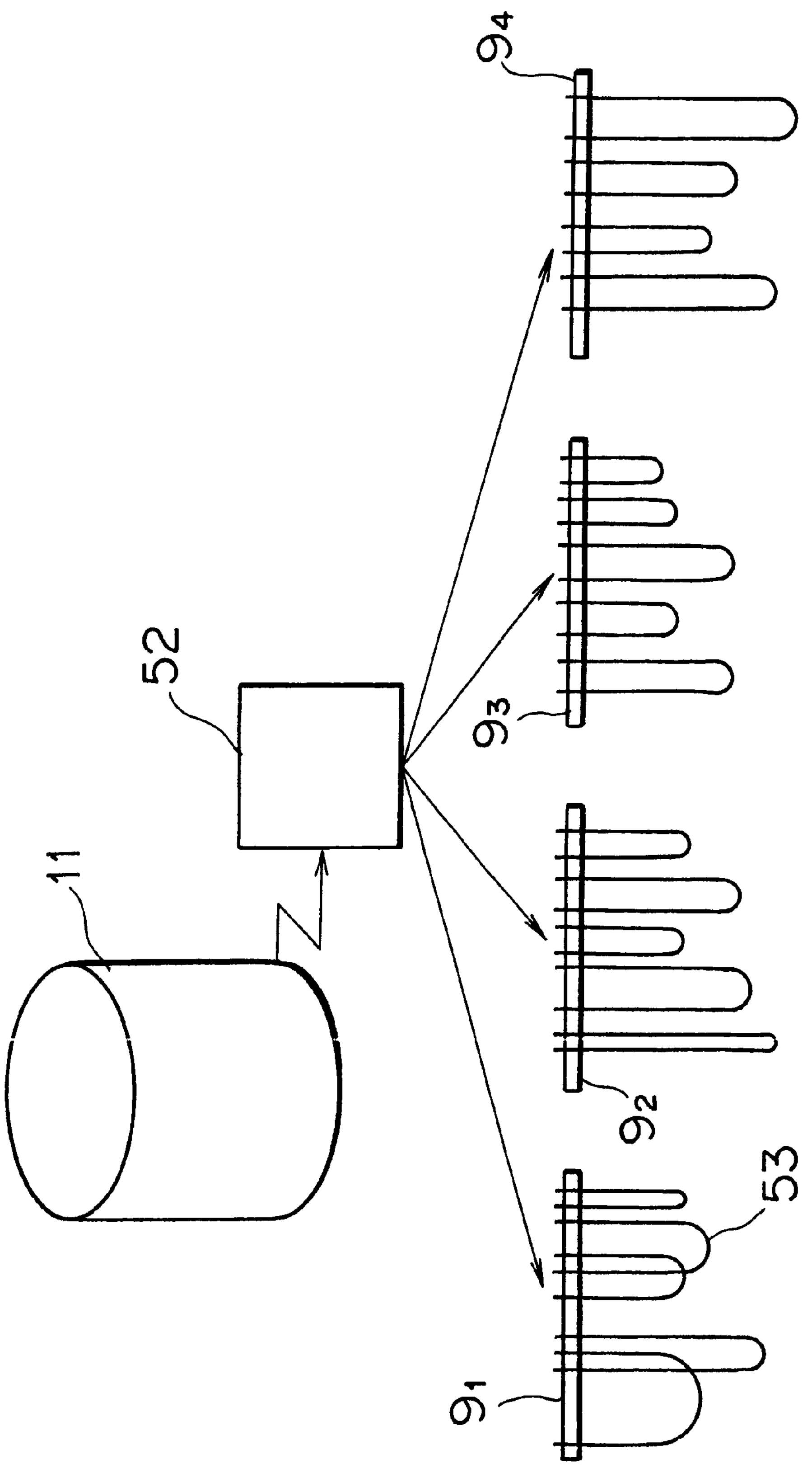
FIG. 4 is a view for explaining the state where the detailed data for a wire is divided for each pole.

As shown in FIG. 3, the wire clamping pole 9 is fixed on a wire clamp position designating jig 10 by a manual clamp 56. On the designating jig 10, LEDs (light emitting display lamps) 43 are arranged corresponding to the respective clamping positions. The wires 53 are sequentially implanted in the clamps 42 designated by the LEDs 43 so that one or plural wire clamping poles 9 constitute a set of sub-wire harnesses.

As seen from FIG. 1, in the network 1, a bus line (e.g. coaxial cable) is connected to a host computer (first computer) 11, a receiving personal computer (second computer) 12, a file server 13, a master personal computer (third personal computer) 14 and a subsidiary personal computer (fourth personal computer) 15. Further, the bus line 16 is connected to personal computers (PC) 17 and 18 for the cutting step 2 and peeling step 3 through signal lines 19 and 20, and also connected to accessory combining step 4, terminal crimping/wire jointing steps 5, 6 and terminal inserting step 7 through LON servers 21–23, and signal lines 24–26, respectively. The LON servers 21–23 are connected to a downstream LON network. The LON (Local Operating Network) is mainly directed to the transmission/reception of control command statuses whereas the LAN (Local Area Network)is mainly directed to movement of a large amount of messages.

LON servers 21, 22 and 23 are connected to information terminal devices 27, 29 and 32 for control (ACE III) respectively, which are in turn connected to bar code scanners 36, 37 and 38 on the input sides and the wire clamp position designating jigs (pole LEDs) $\mathbf{10}_1$–$\mathbf{10}_3$ (LEDs 43 in FIG. 3) on the output sides and monitors 44, 45. The information terminal devices 27, 29 and 32 are connected in parallel to other information terminal devices 28; 30, 31; and 33. These information terminal devices 28; 30, 31; and 33 are connected to an accessory shelf LED 46, terminal crimping machines 48, 49 and monitor 50, respectively.

These information terminal devices 27–33, which are directed to dispersion control, may preferably be e.g. Oppen Map (trade name) available from TOSHIBA ELECTRIC CO. LTD, which may be replaced by a controller or sequencer. The information terminal devices 27–33 can instantaneously collect/monitor information on the shop floor inclusive of facility operating status data, production quantity data, quality monitoring data, etc. The information terminal devices are particularly preferable in the case where an information source and an information destination are dispersed in several branches and where a present intensive control system is shifted to a dispersion control system. The information terminal devices 27–33 are connected to steps or devices so that they are integrated to monitoring personal computers and POP terminals (bar code scanner). In this way, while an operator is present in an office, he can easily effect the information management on the production floor, recognize the track record in the production line in real time in comparison to planed production information. The use of the POP terminal makes a handwritten slip unnecessary. Thus, these information terminal devices can be easily connected to upstream computers.

The LON servers (data converters for the information terminal devices) 21–23 manages the LON network, particularly information terminal devices 27–33. The information terminal devices 27–33 request data necessary for each work from the LON servers 21–23 and display the data on the monitors 44, 45 and 50.

The host computer 11 manages the data necessary to produce wire harnesses. The receiver personal computer 12 adds the wire clamp position data or other data in the wire clamping pole 9 to the data received from the host computer 11 to create pole-classified data. The other data than the wire clamping position data include accessory shelf position (address) data and machine number designation data of machines such as crimping machines or soldering machines.

The pole-classified data includes the following contents. Now it is assumed that the detailed data (wire product No. size, cutting length, etc.) received from the host computer 11 are data of a product of 100 circuits (e.g. product No. A). In this case, for example, if only 25 circuits can be set in the wire clamping pole 9 (FIG. 2), the data must be distributed for four wire clamping poles $9_1$–$9_4$. For this purpose, the data processed for the "sub-assy" are automatically divided into four components and distributed to the wire clamping poles $9_1$–$9_4$. These data refer to "pole-distributed data". The pole-distributed data include the detailed data (wire product No. size and cutting length, etc.) for 25/100 circuits and the position data of the clamp 42 in any of the wire clamping poles $9_1$–$9_4$ where the wire 53 is to be clamped.

In FIG. 1, the file server 13 manages the upstream network and also manages the data necessary for production. The master personal computer 14 checks each master file or data against the data allotted to the wire clamping by the receiver personal computer 12. The printer 54 outputs the list necessary for work. The subsidiary personal computer 15 allots the data processed by the master personal computer 14 to the wire clamping poles 9.

Where the system of FIG. 1 is used within a comparatively narrow area such as a single factory, the host computer 11 is replaced by a locating server (first computer), the receiver personal computer 12 is replaced by a data server (second computer) and the file server 13 can be omitted. In FIG. 1, the components located above from the bus line 16 or the LON servers 21–23 constitute the upstream network.

Figure 5:
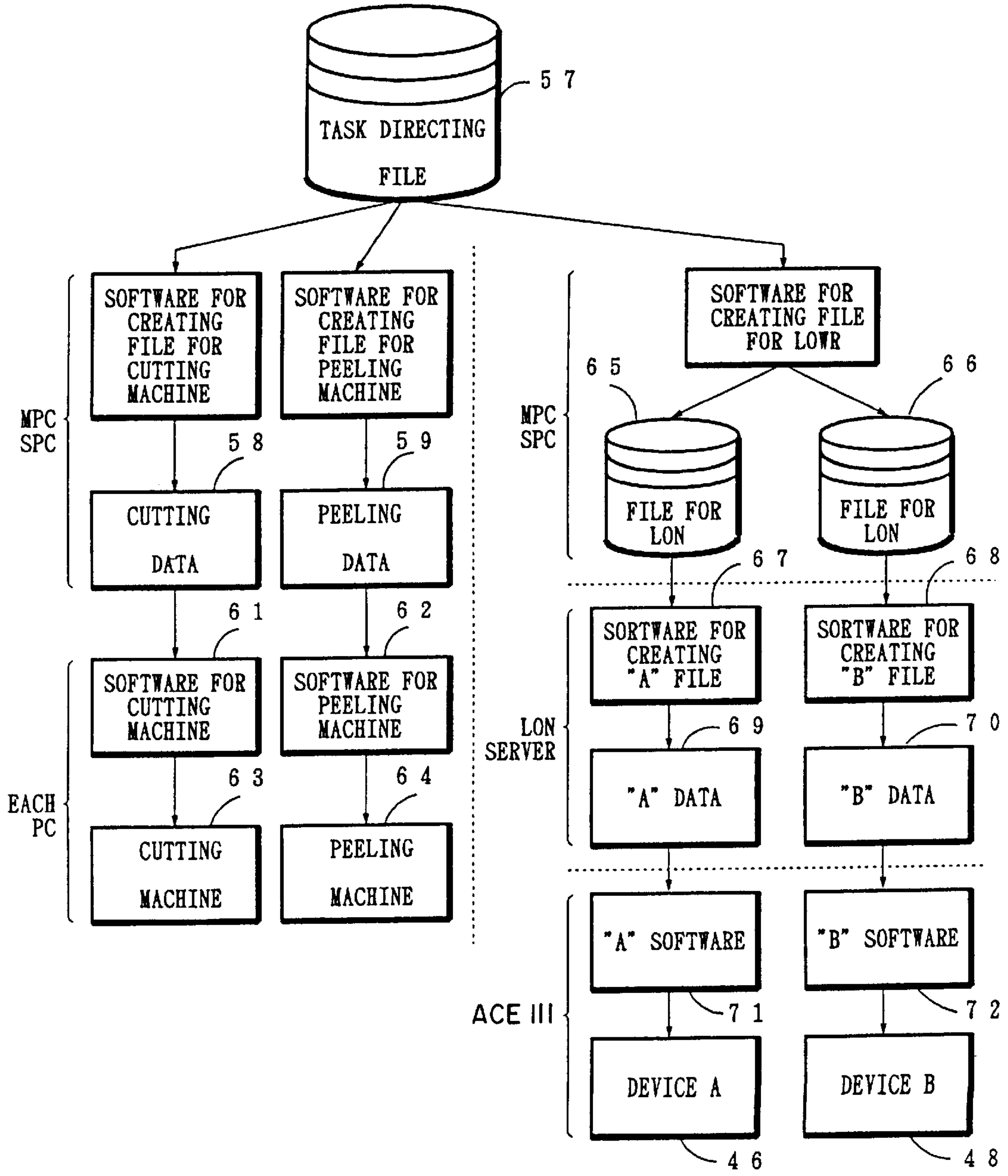
FIG. 5 is a view for explaining the data flow in a system.

FIG. 5 shows the flow of data signals in the network as shown in FIG. 1.

First, the data (work designation file) supplied with the clamping positions by the receiver personal computer 12 are stored in the file server 13. On the basis of the data 57, three data of cutting data 58, peeling data 59 and LON files 65, 66 are created by the master personal computer (data creator for the entire process) 14 and the subsidiary personal computer 15.

The cutting data 58 is sent to the cutting machine 63, and the peeling data 59 is sent to the peeling machine 64. Since the machines (cutting machine 63 and peeling machine 64) are provided with control personal computers 17 and 18, respectively, the cutting data 58 and peeling data 59 are directly supplied to the control personal computers 17 and 18, respectively. The control personal computers 17 and 18 process the data 58 and 59 in accordance with the necessary data and order and directly transfer the data thus processed to the cutting machine 63 and the peeling machine 64.

Using the file creating software's ("A" and "B" file creating software's 67 and 68) for the LON servers 21–23, the LON files 65 and 66 are processed into data ("A" and "B" file data 69 and 70). The data 69 and 70 are sent to the devices (e.g. accessory shelf LED 46 and terminal crimping machine 48) using the softwares 71 and 72 in the information terminal device (ACE III), respectively. Incidentally, the LON files 65, 66 are general irrespectively of the facility and process, and the step specification (specified facility) using the information terminal devices 27–33 can be modified by a user.

A detailed explanation will be given of each of the steps as shown in FIG. 1.

In the wire cutting step 2, with a bar code scanner 34 connected to the personal computer 17 and with the personal computer 17 connected to the automated cutting machine 61, the cutting machine 61 carries out sizing, cutting and cover peeling (middle position) of the wire and implanting of the wire into the wire clamping pole 42 (FIG. 2).

Figure 6:
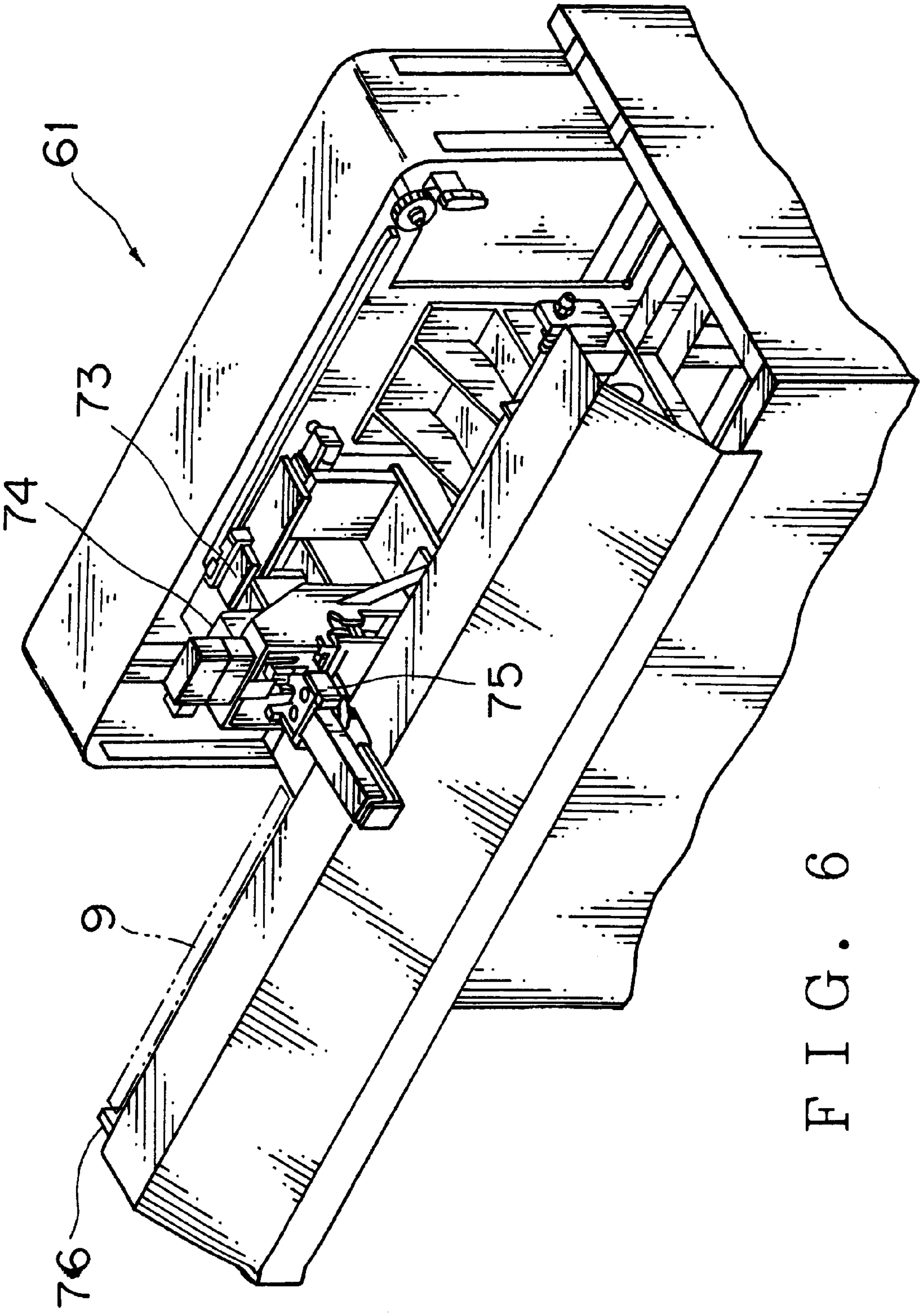
FIG. 6 is a perspective view of am automated wire cutting machine.

The automated cutting machine 61, as shown in FIG. 6, a sizing reel unit 72 for sizing wires supplied from 120 wire selecting nozzles, a peeling unit 74 for peeling the middle portion of the sized wire, a cutting/implanting unit 75 for cutting and implanting the wire into the wire clamping pole 9, and a setting portion 76 in which the wire clamping pole 9 is set. The cutting/implanting unit 75 or setting portion 76 is moved horizontally by servo control so that the wire is implanted in the required clamp.

In the peeling step 3 in FIG. 1, like the wire cutting step 2, with the bar code scanner 35 connected to the personal computer 18 and with the personal computer 18 connected to the automated peeling machine 62, the automated peeling machine 62 peels the end portion of the wire.

Figure 7:
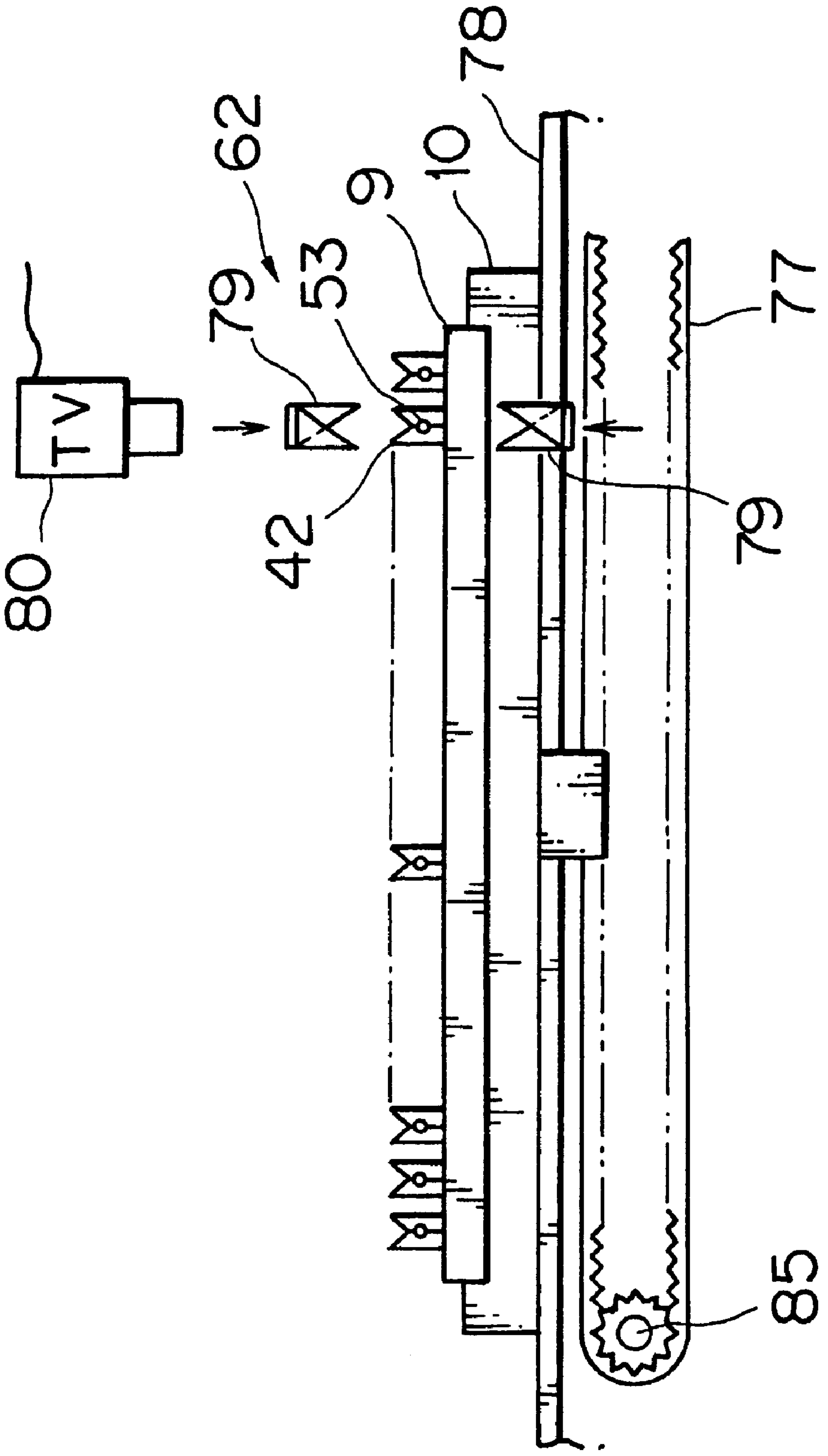
FIG. 7 is a front view of am automated peeling machine.
Figure 8:
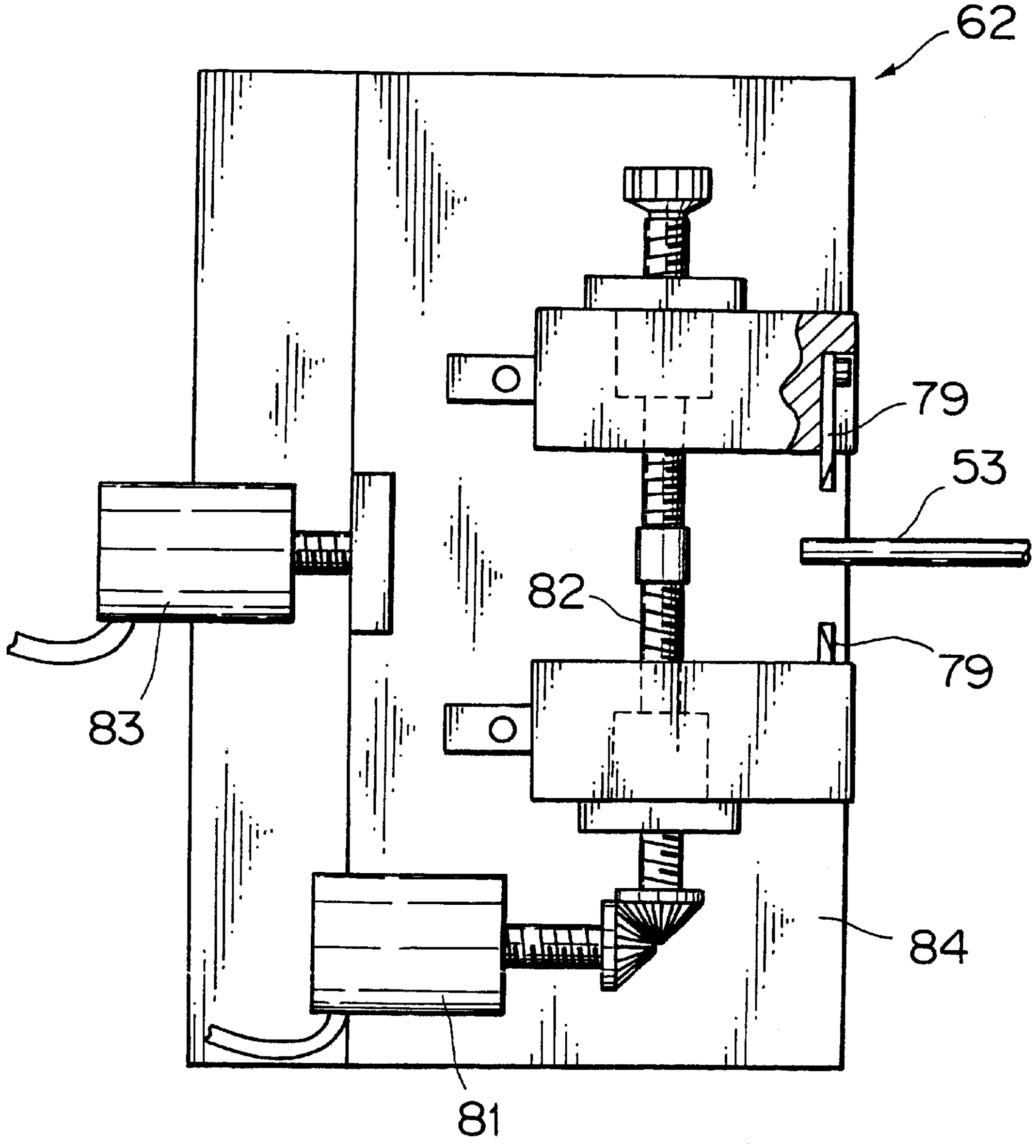
FIG. 8 is a front view of a main part of an automated peeling machine.

As shown in FIG. 7, the automated peeling machine 52 shifts the wire clamp position designating jig 10 along a horizontal rail 78 by drive of a belt 77 so that the wire 53 in the desired clamp 42 of the wire clamping pole 9 is located between and peeled by a pair of peeling blades 79. The peeling state of the wire 53 is automatically tested by a television camera 80. As shown in FIG. 8, the pair of peeling blades 79 are located on both sides of the terminal of the wire 53, and is moved to the wire by rotation of a screw shaft 82 by a first servo motor 81 to make an incision on the covering of the wire 53. Subsequently, the blades 79 are moved backwards together with the base plate 84 by rotation of a second servo motor 83 so that the covering is removed off from the wire 53.

In FIG. 7, the wire clamping pole 9 is set in the wire clamp position designating jig 10 by an operator. The bar code of the wire clamping pole 9 is read using the scanner 35 in FIG. 35 so that the personal computer 18 reads the product number of the sub-wire harness relative to the wire clamping pole 9 and receives the manufacturing instruction for the sub-wire harness from the upstream network. Thus, the belt 77 of the automated peeling machine 62 in FIG,. 7 is driven by a servo motor 85so that the required wire 53 is located between the peeling blades 79 and its end portion is peeled.

In FIG. 1, between the automated cutting machine 61 and automated peeling machine 62, a rail (not shown) is provided for moving the wire clamping pole 9.

Additionally, in the peeling step in FIG. 1, a plurality of different kinds of peeling machines (not shown) are arranged and any of them may be automatically selected in such a manner that the wire clamp position designating jig 10 and the operation display lamp of each peeling machine are connected to each other by the same information terminal device 29 as in the terminal crimping step 5 described later. In the cutting and peeling steps 2 and 3, personal computers 17 and 18 are sufficient to handle the required communication volume.

In the accessory combining step in FIG. 1, the first information terminal device 27 is connected to the first LON server 21 through an interface 86, to a bar code scanner 36 on the input side, and to the pole LED on the output side, i.e. wire clamping position designating jig 10$_1$. The first information terminal device 27 is also connected to a monitor 44 in parallel to the pole LED 10$_1$. Using the moving cart 88, the first information terminal device 27, bar code scanner 36, interface base plate 87, pole LED 10$_1$ and monitor 44 can be moved simultaneously.

The second information terminal device 28 is connected in parallel to the first information terminal device 27. The second information terminal device 28 is also connected to an accessory shelf LED 46 through a sequencer 89 and a wire stocker LED 47 through an interface base plate 90.

Figure 9:
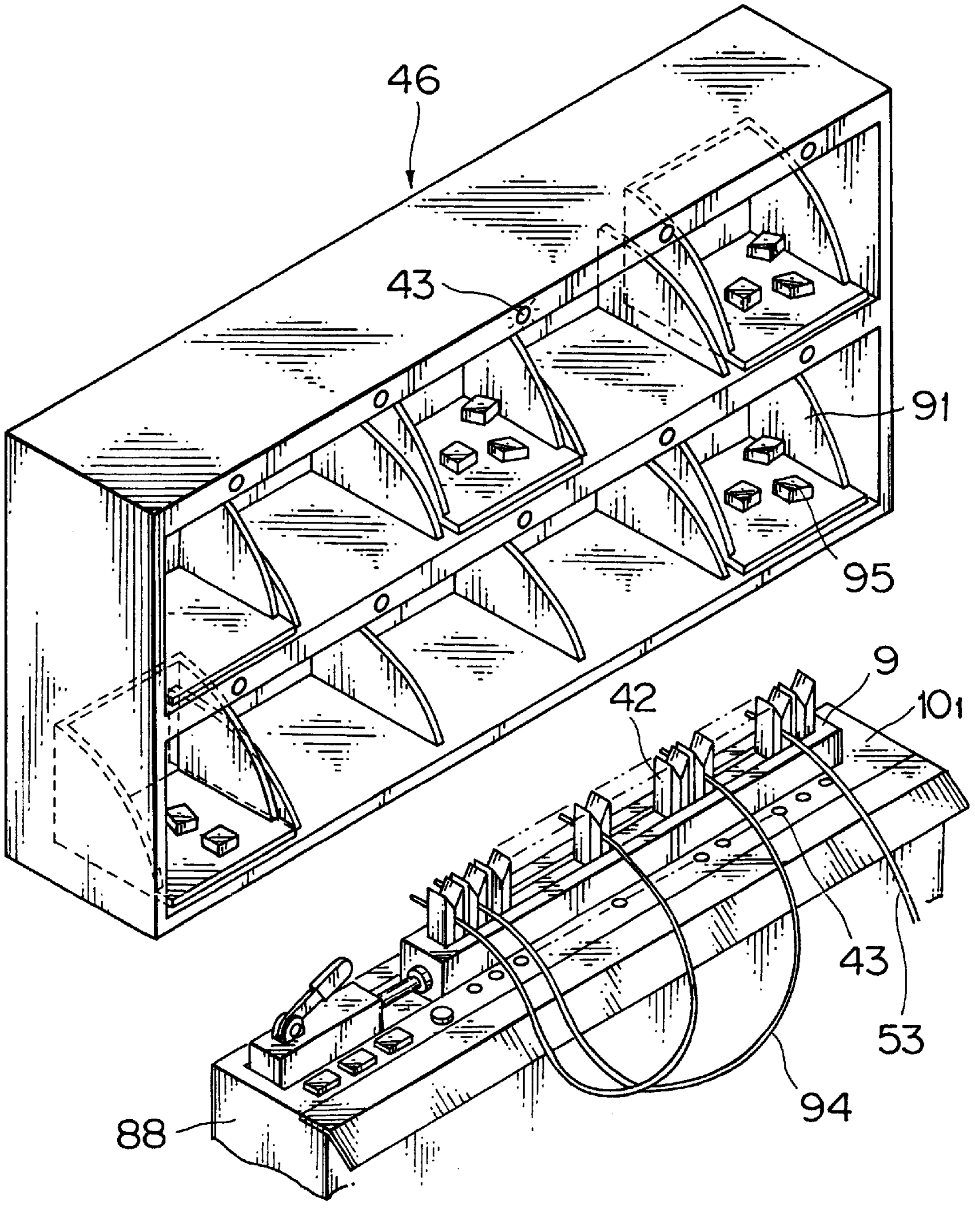
FIG. 9 is a perspective view of an accessory combining step.

As shown in FIG. 9, the accessory shelf 46 is located in front of the wire clamp position designating 10$_1$. The wire clamp position designating jig 10$_1$ is provided with LED's 43 arranged corresponding to the positions of the respective clamps 42 of the wire clamping pole 9. The wire clamping pole 9 is set in the wire clamp position designating jig 10$_1$ via the peeling step 3. The accessory shelf 46 is provided with different accessory boxes 91 in which different accessories are housed and LED's 43 arranged correspondingly to the accessory boxes 91.

The wire clamp position designating jig 10$_1$ is located on a fixed stand or a moving cart 88 used in the crimping step described below. In FIG. 1, between the automated peeling machine 62 and the wire clamp position designating jig 10$_1$, a rail (not shown) may be arranged for moving the wire clamping pole.

Figure 10:
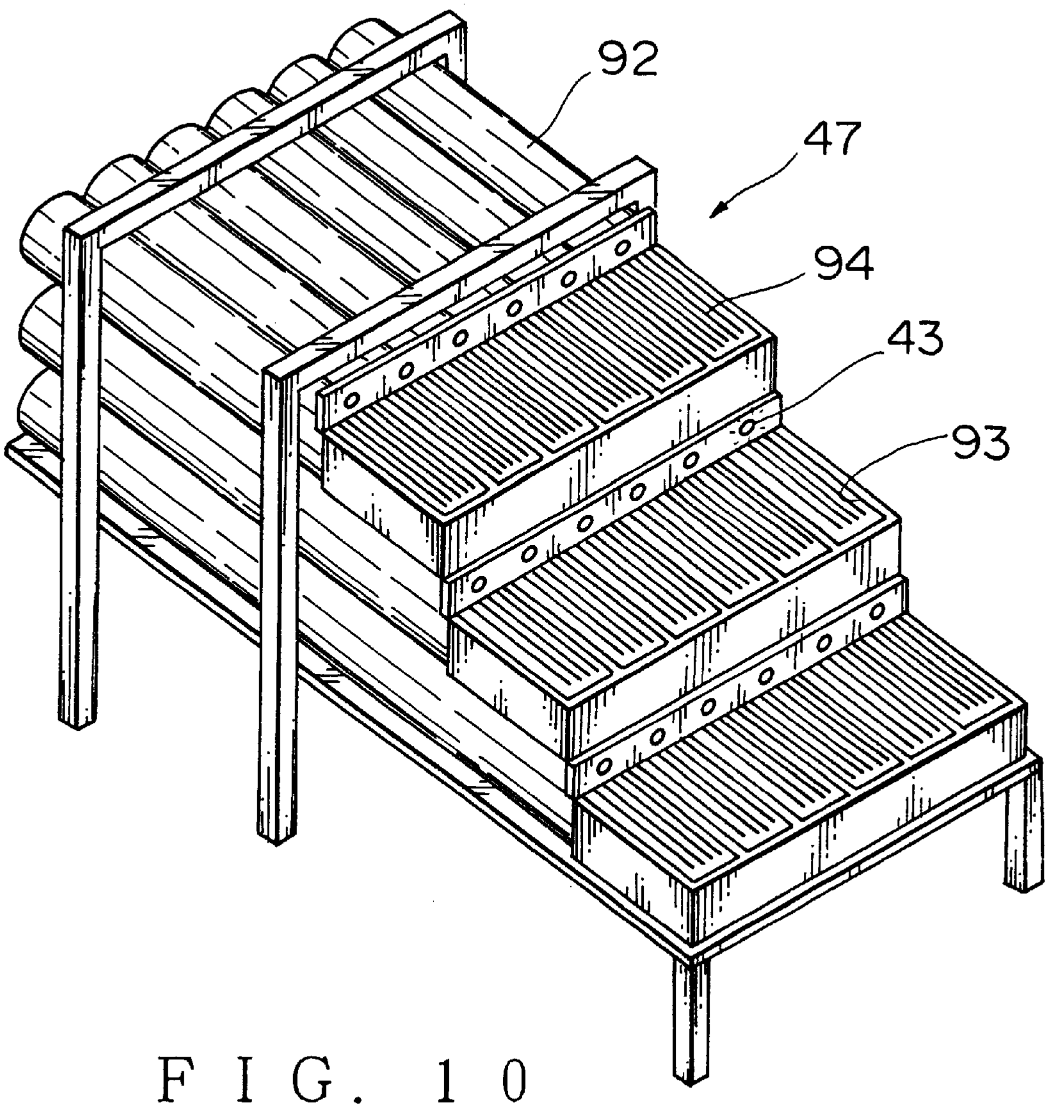
FIG. 10 is a perspective view of a wire stocker.

A wire stocker 47 as shown in FIG. 10 is located beside the accessory shelf 46. The wire stocker 47 has a plurality of wire housing cylinders 92 arranged in parallel and in plural stages. Each wire housing has an opening 93 in its front, and the LED 43 is provided on the upper side of each opening 93. Within the wire housing cylinder 92, several kinds of special electric wires such as a twisted wire or shielded wire are housed. A worker pulls out the wire 94 from the opening 93 designated by an LED 43, and implants it in the clamp 42 designated by the LED 43 of the wire clamping pole 10$_1$ shown in FIG. 9.

In FIG. 1, the manufacturing designating data are sent to the pole LED 10$_1$, accessory shelf LED 46 and wire stocker LED 47 from the upstream network through the information terminal devices 27, 28. Then, each LED illuminates. The worker picks up the electric wire 53 from the clamp 42 with the LED illuminated in the pole LED 10$_1$ and the accessory 95 from the accessory box 91 with the LED illuminated in the accessory shelf LED 46 and mounts the accessory 95 to the wire 53. Otherwise, the worker takes out a special wire 94 from the wire housing cylinder 92 with the LED illuminated in the wire stocker LED 47 and the accessory 95 from the accessory box 91 with the LED emitted light, and combines the accessory 95 with the special wire 94.

In the terminal crimping/wire jointing steps 5 and 6 as shown in FIG. 1, the second LON server 22 is connected to the third information terminal device 29. The third information terminal device 29 is connected to a bar code scanner 37, a pole LED 10$_2$ (i.e. wire clamp position designating jig) through an interface base plate 96, and a monitor 45. These components can be simultaneously moved by a moving cart 97.

The third information terminal device 29 is connected in parallel to a fourth information terminal device 30. The fourth information terminal device 30 is connected in series with a crimping monitor 98 and a servo press (crimping machine) 48. The servo press 48 is connected in parallel to the fourth information terminal device 30 through a signal line 99. A task display lamp 100, which is located beside the servo press 48, is connected to the fourth information terminal device 30.

The fourth information terminal device 30 is connected in parallel to a fifth information terminal device 31. The fifth information terminal device 31 is connected in series with a crimping monitor 10$_1$ and multiple die press (crimping machine) 49. The multiple die press 49 is connected in parallel to the fifth information terminal device 31 through a signal line 102. A task display lamp 103, which is located beside the servo press 49, is connected to the fifth information terminal device 31.

A second servo press (not shown) may be arranged beside the multiple die press 49. In this case, the fifth information terminal device 31 is connected in parallel to the other terminal device (not shown) through a signal line. The other terminal device is connected to the multiple die press 49.

The servo press 48 may be a known device which rises or falls the shaft of an applicator using a servo motor (not shown) to crimp a terminal on a wire between an upper die (crimper) and a lower die (anvil).

Figure 11:
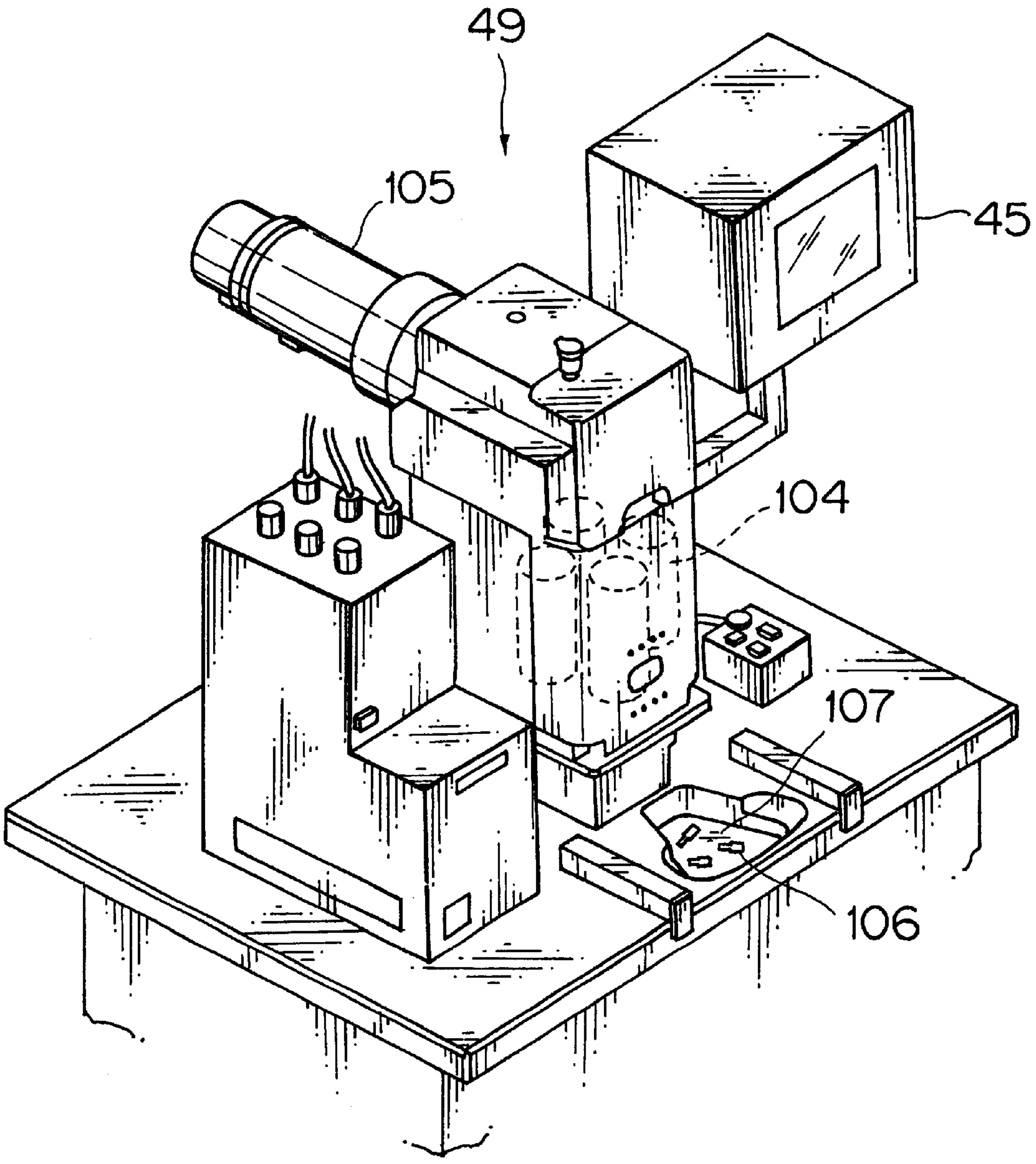
FIG. 11 is a perspective view of a multiple-die crimping machine.

As shown in FIG. 11, the multiple die press 49 is provided with a plurality of applicators 104 arranged radially, and can select a required applicator 104 by drive of a servo motor 105. The applicators 104 are automatically selected using a signal transferred to the fifth terminal device 31 through the LON server 22 as shown in FIG. 1. The multiple die press 49 is connected to the crimping monitor 45 which can recognize the crimping state of the terminal. Terminals (located at random) 106 are housed according to a kind in each housing portion 107. When a certain applicator 104 is selected, the corresponding housing portion 107 is rotated together therewith to select the terminal automatically.

Figure 12:
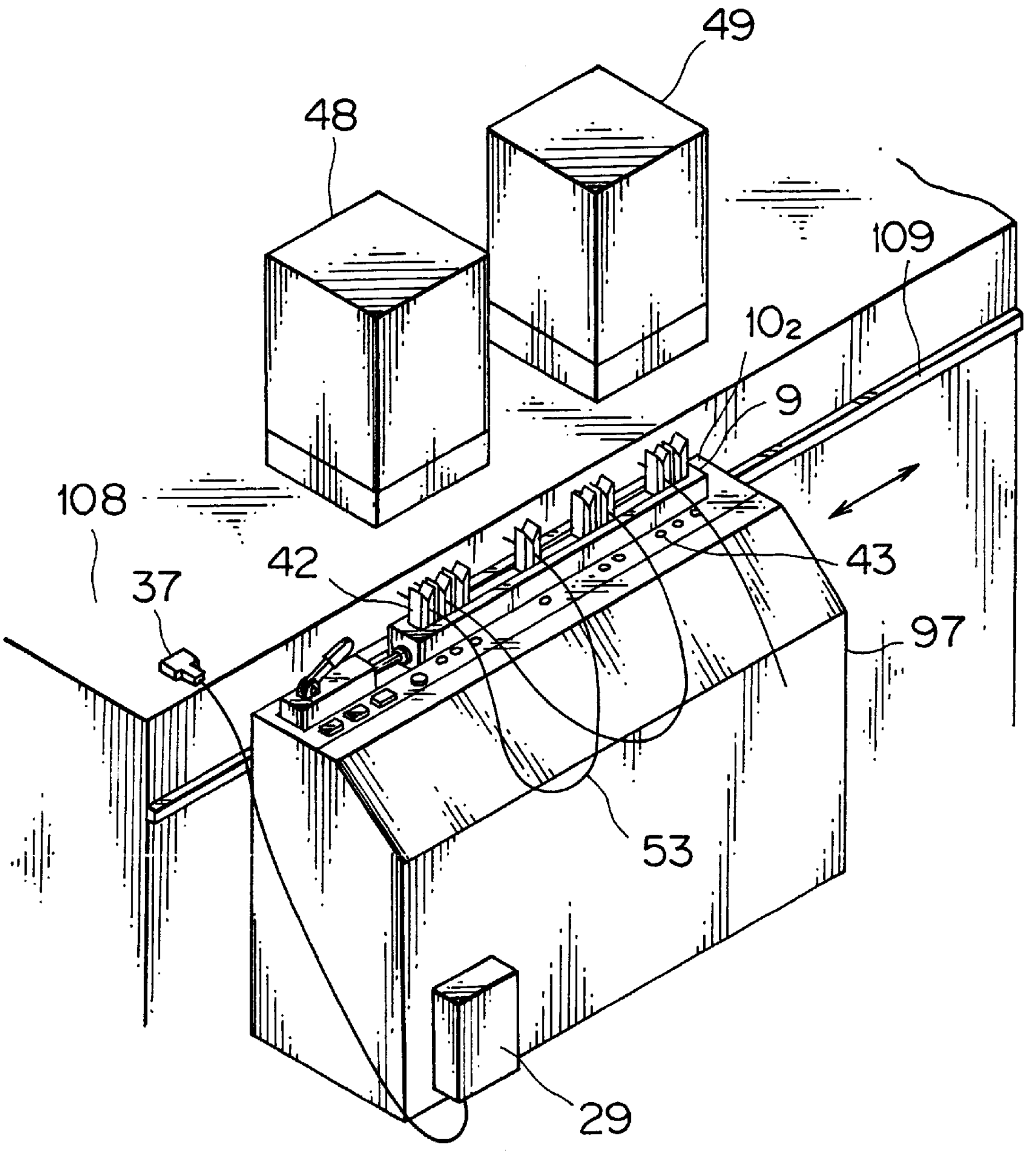
FIG. 12 is a perspective view of a moving cart in a terminal crimping step.

As shown in FIG. 12, the crimping machines 48 and 49 are arranged on a supporting stand 108, and in front of the supporting stand 108, a moving cart 97 is arranged movably in a horizontal direction on a rail 109. The moving cart 97 carries the wire clamp position designating jig 10$_2$, information terminal device 29 and bar code scanner 37. The wire clamping pole 9 is set in the wire clamp position designating jig 10$_2$, and the wires 53 and 94 are implanted in the clamps 42 of the wire clamping pole 9. On the wire clamp position designating jig 10$_2$, an LED 43 is arranged corresponding to each clamp 42.

Instruction data are directly transferred from the upstream network shown in FIG. 1 to each crimping machine 48, 49 through the information terminal devices 29–31. The worker takes out the wire 53, 94 from the clamp 42 with the LED illuminated and crimps the terminal on the wire taken out using the designated crimping machine 48 or 49. Thereafter, the wire is put back to the clamp 42.

Both the terminal crimping and wire jointing can be effected by the same servo press 48. Otherwise, in FIG. 1, the fifth information terminal device 31 is connected in parallel to one or plural other information terminal devices (not shown) which are in turn connected to a joint servo press (not shown) like the servo press 48.

In the terminal insertion step in FIG. 1, the third LON server 23 is connected to a sixth information terminal device 32 which is in turn connected to a bar code scanner 38 and a pole LED $10_3$ (wire clamp position designating jig) through an interface base plate 110. These components can be simultaneously moved by a moving cart 111.

The sixth information terminal device 32 is connected in parallel to a seventh information terminal device 33 which is in turn connected to a monitor 50. The monitor displays which terminal chamber of a connector housing (not shown) a terminal is to be inserted into. Instruction data are directly transferred from the upstream network shown in FIG. 1 to the pole LED $10_3$ and monitor 50 through the information terminal devices 32–33.

In the embodiment of FIG. 1, the LON servers 21–23 are arranged for the steps 4, 5/6, and 7 of accessory combining, terminal crimping/wire jointing and terminal insertion to increase the processing speed. However, the same LON server may be shared between e.g. the accessory combining step 4 and the terminal insertion step 7. In this case, the signal line 112 in the accessory combining step 4 in FIG. 1 is directly connected to the sixth information terminal device 32 in the terminal insertion step 7 to exclude the third LON server 23 so that the first LON server 21 can control the accessory combining step 4 and terminal inserting step 7 and the second LON server 22 can control the terminal crimping/wire jointing steps 5/6.

In FIG. 1, an additional cutting machine (not shown) for wires used with a low frequency may be arranged in parallel to the automated cutting machine 61. In this case, this additional cutting machine is connected to a sequencer (not shown) which is in turn connected to a wire shelf LED (not shown). The additional cutting machine and sequencer are connected to a personal computer (not shown) which is in turn connected to the bar code scanner and the pole LED.

Figure 13:
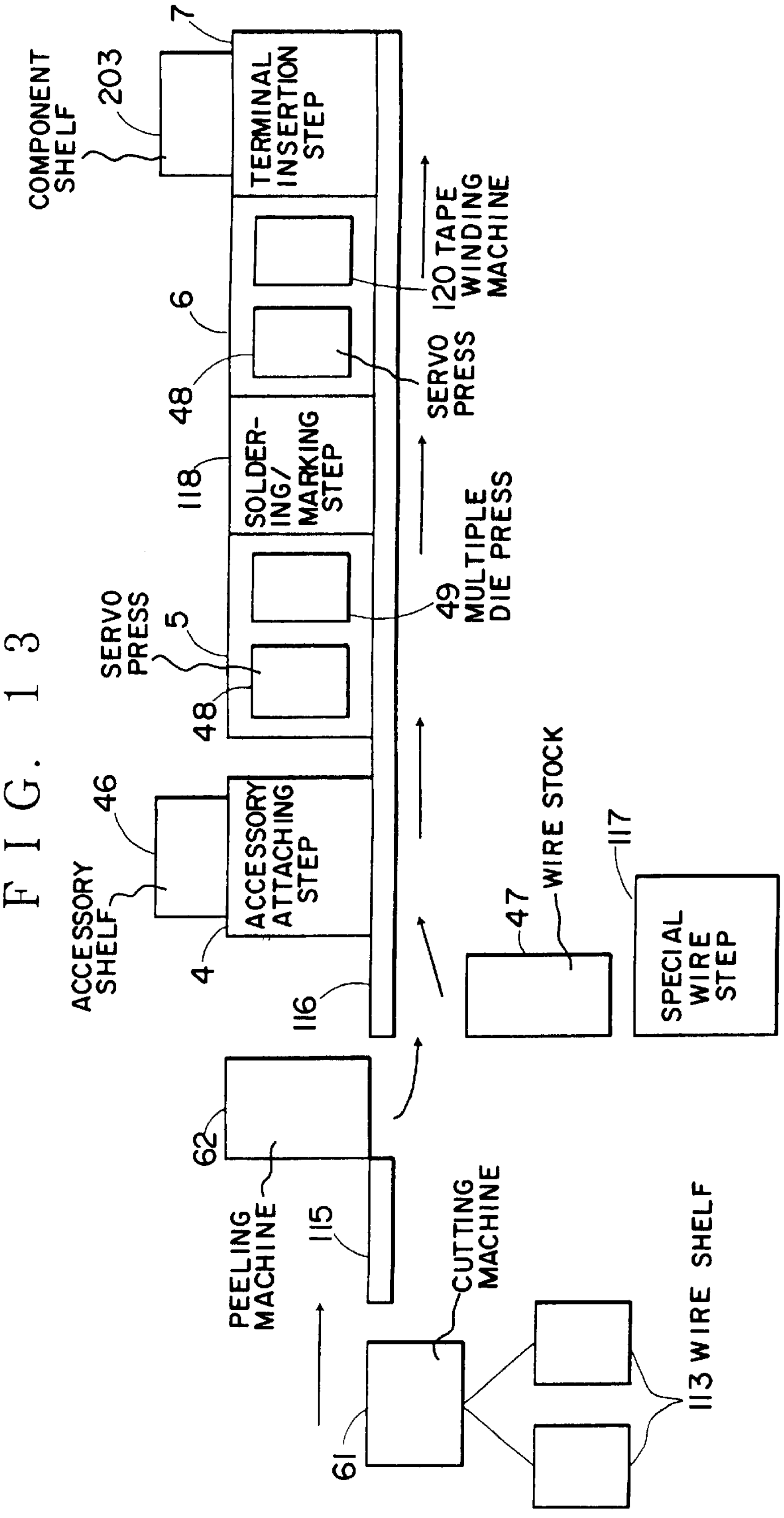
FIG. 13 is a plan view of one example of a step layout.

FIG. 13 shows an example of the layout of the steps as described above. FIGS. 14A–14G show formats of the sub-wire harnesses in the respective steps. An explanation will be given of the respective steps.

Figure 14A:
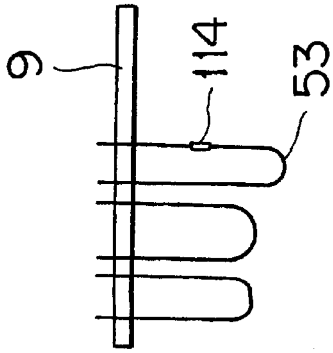
FIGS. 14A–14G are plan views of manufacturing formats of sub-wire harnesses in respective steps.

The wires 53 used with a high frequency each having a sectional area of 0.3–3.0 $mm^2$ are transferred from a wire shelf 113 to an automated cutting machine 61, and cut to have a required length. Their middle portions are peeled (114) and the wires thus created are implanted in the wire clamping pole 9 (FIG. 14A). Beside the automated cutting machine 61, a cutting machine (not shown) may be arranged for cutting, peeling and implanting the wires used with a low frequency each having 0.3–3.0 $mm^2$.

Figure 14B:
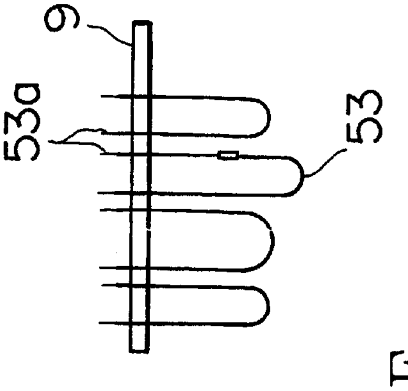
Figure 14C:
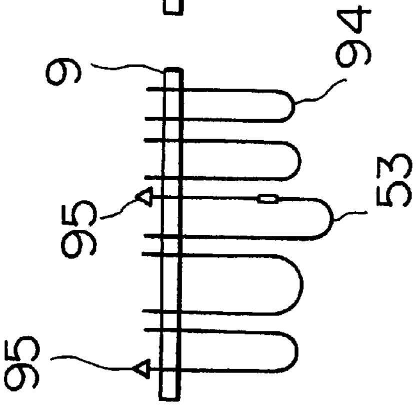

The wire clamping pole 9 with the wires each having a prescribed length implanted is transferred to a pole-setting automated peeling machine 62. The ends 53*a* of the wires are peeled by the automated peeling machine 62 (FIG. 14B). The wire clamping pole 9 is transferred to the accessory combining step 4 along the rail 116 and carried on a moving cart. In the accessory combining step 4, accessories such as a tube and water-proofing rubber stopper are taken out from the accessory shelf 46 and combined with the wires 53. At the same time, a required wire(s) is taken out from the wire stocker 47 for a special wire step 117 by which a special wire (inclusive of a heavy wire of 5 sq or larger, shielded wire and twisted wire) is subjected to several kinds of processing such as cutting and peeling, and is implanted in the clamp of the wire clamping pole 9 (FIG. 14C).

Figure 14D:
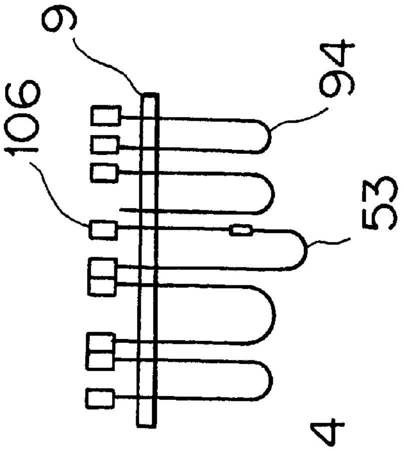

The wires 53 and 94 combined with the accessories are transferred, together with the wire clamping pole 9, to the terminal crimping step 5 along the rail 16 and carried on a moving cart. Terminals 106 are crimped on the ends of the wires 53 and 94 using the servo press 48 and multiple die press 49 (FIG. 14D). The moving cart is installed for each of the steps, and the information terminal device is mounted on each moving cart.

Figure 14E:
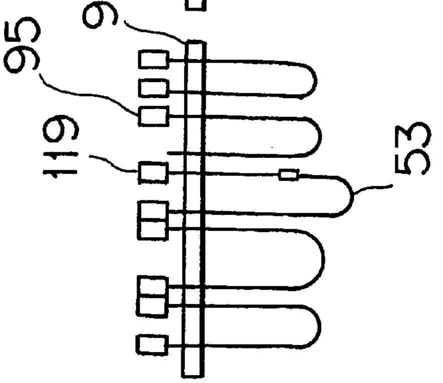

The wires subjected to the terminal crimping are transferred to the adjacent soldering/marking step 118. In this step, soldering 119 is made for the crimping portion of a required terminal 95 and jointing portion of the wire to reinforce the crimping portion and jointing portion (FIG. 14E). A soldering machine is classified in uses of thin and thick solders, or iron soldering and jab soldering. Each soldering machine is equipped with an LED for designating the machine number to be used. The LED receives a signal from the upstream network through the same personal computer as in the wire cutting step 2 and through the same information terminal device as in the accessory combining step 4. This applies to the marking step.

The marking step serves to identify the terminal 95 crimped on the same kind of wire 53 in the terminal inserting step, and makes a marking 119 on the crimping portion of the terminal using a marker. The marker is selected by the LED through an instruction from the high order network.

Figure 14F:
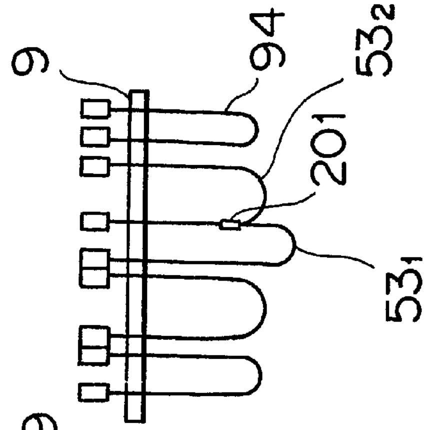

The terminal-equipped wires 53 and 94 subjected to the soldering/marking are sent, together with the wire clamping pole 9, to the adjacent wire jointing step 6. The servo press 48 and a tape winding machine 120 are arranged for the wire jointing step 6. The end of another wire $53_2$ is branch-coupled with the middle peeled portion of the wire $53_1$ at a joint terminal 201 (FIG. 14F). An insulating tape is wound around the joint portion. The required joint portion is subjected to the soldering step before the tape winding step. The soldering step is monitored in the jointing step 6.

Figure 14G:
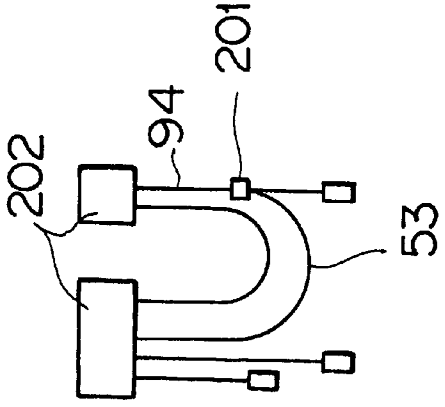

The terminal-equipped wires 53 and 94 subjected to the jointing are sent, together with the wire clamping pole 9, to the terminal insertion step 7. In the terminal insertion step 7, the terminals of 95 on the one or both sides of the wires 53 are inserted in a connector housing 202 (FIG. 14G). The connector housing 202 to be used is designated by the LED arranged on a component shelf 203 to which a designation signal is supplied from the upstream network.

Using the flowcharts, an explanation will be given of the working procedure in each step.

Figure 15:
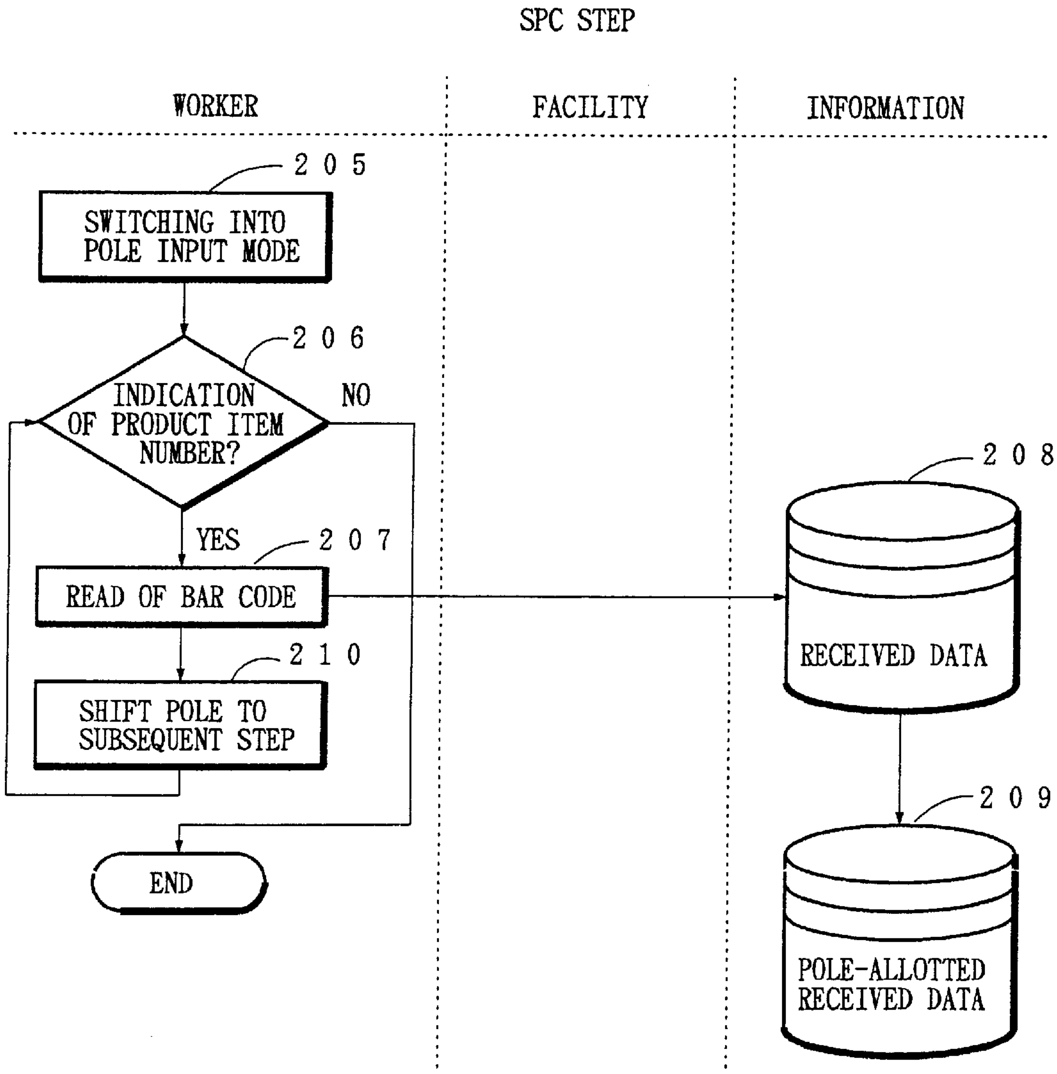
FIG. 15 is a flow chart of an SPC step.

FIG. 15 is a sub-personal computer step in which a wire clamping pole 9 is registered.

First, a worker places a switch of a cutting machine in a pole input mode (205). Where a component number is displayed on a monitor (206), he reads the bar code of the wire clamping pole using a bar code scanner (207). Thus, the number (No) of the wire clamping pole is registered on a data base of received data (208) to indicate the correspondence between the number of the wire clamping pole and the product number of the sub-wire harness. The pole-allotted received data (209) are created on the basis of the received data (208). After having read the bar code, the wire clamping pole data is read to a subsequent step, e.g. wire cutting step (210).

Figure 16:
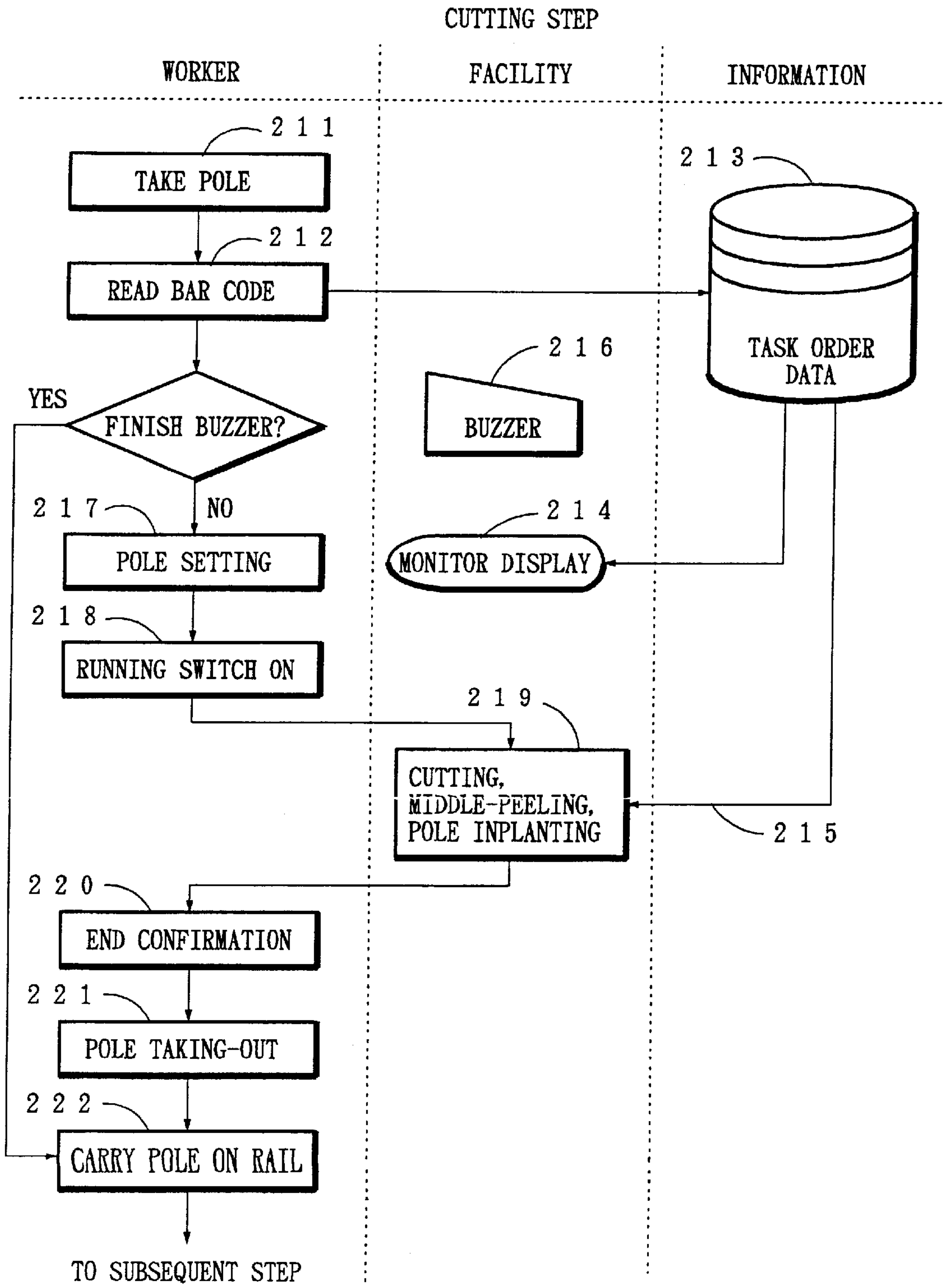
FIG. 16 is a flowchart of a wire cutting step.

FIG. 16 shows a wire cutting step.

First, a worker takes the wire clamping pole (211) and its bar codes using the bar code scanner (212). With the wire clamping pole set in the automated cutting machine (FIG. 6), he may read the bar code. Thus, the item number of the wire clamping pole is input in working order data (213). A product or design number is displayed on the monitor on the basis of the working order data. The signals indicative of the number of a wire introducing nozzle, cutting length, middle-peeling position, middle-peeling size and clamping number of the wire clamping pole (two clamping numbers of both ends of a single wire) are supplied to a personal computer for the automated cutting machine (215).

The worker, as long as he does not hear a finish buzzer (216), sets the wire clamping pole in the automated cutting machine and turns on an operation switch (218). Thus, the cutting, middle-peeling and implanting of the wires into the wire clamping pole are carried out automatically (219). After the worker recognizes the completion of operation of the automated cutting machine, he takes out the wire clamping pole from the automated cutting machine(221), carries it on the rail (222) and send it to the subsequent step (peeling step).

Figure 17:
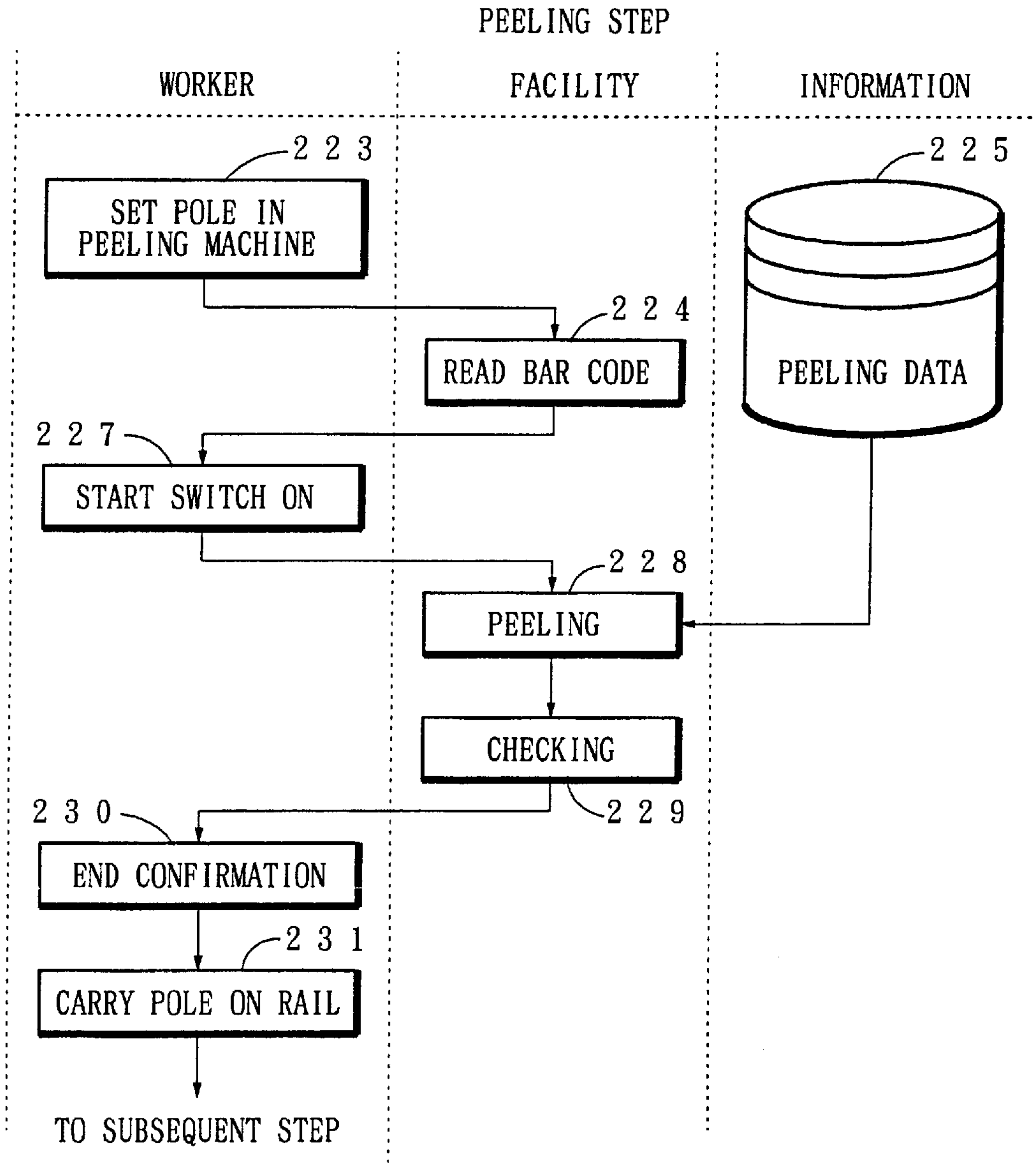
FIG. 17 is a flowchart of a wire peeling step.

FIG. 17 shows the film peeling step.

First, a worker sets the wire clamping pole in the automated peeling machine (223). He reads the bar code of the wire clamping pole using the bar code scanner (224). Thus, the number of the wire clamping pole is supplied to a file of film-peeling data of a personal computer. The peeling data inclusive of a wire number, wire size, clamping number (two clamping numbers of both ends of a single wire) and film-peeling size of each terminal are supplied to the automated film-peeling machine (226).

The start switch of the automated film-peeling machine is turned on (227). The ends of each wire are automatically peeled (228). The peeling state is monitored automatically by image processing. After completion of the peeling is confirmed (230), the worker carries the wire clamping pole on a shifting rail (231), and sends the wire clamping pole to the subsequent step (accessory combining step).

Figure 18:
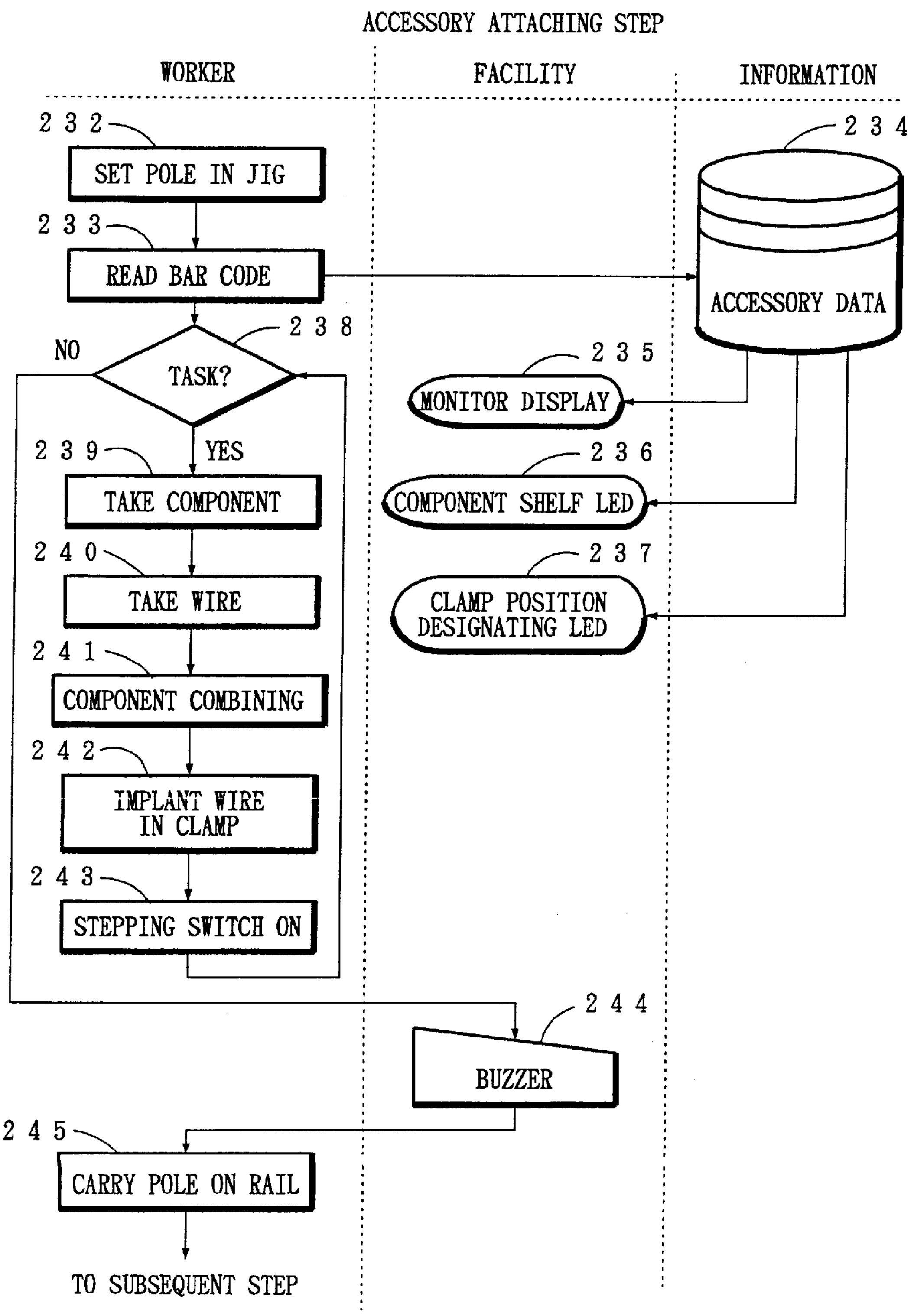
FIG. 18 is a flowchart of an accessory combining step.

FIG. 18 shows an accessory combining step.

First, a worker sets the wire clamping pole in the wire clamp position designating jig (232). He reads the bar code of the wire clamping pole (233). Thus, the number of the wire clamping pole is supplied to an accessory data file (234). The product number, design number and task name of the sub-wire harness are displayed on the monitor (235). A component shelf address signal is outputted from the accessory data to cause the LED of a component shelf to be used illuminates (236). A clamping number signal is outputted to cause the LED of a wire clamp position designating jig to illuminate (237).

The worker recognizes the presence of a task from the display of the monitor and lighting of the LED. He takes the component (water-proofing stopper, insulating tube, etc.) with the LED emitted in the component shelf (239), pulls out the wire from the clamp with the LED illuminated, and combines the component with the wire (241). Thereafter, the component-equipped wire is manually implanted in the clamp with the LED illuminated (242). He turns on a stepping switch (243) to confirm the presence or absence of a task. If no task is present, the buzzer sounds (244). Then, he carries the wire clamping pole on the shifting rail (245) and sends to the subsequent step (implanting step of a special wire).

Figure 19:
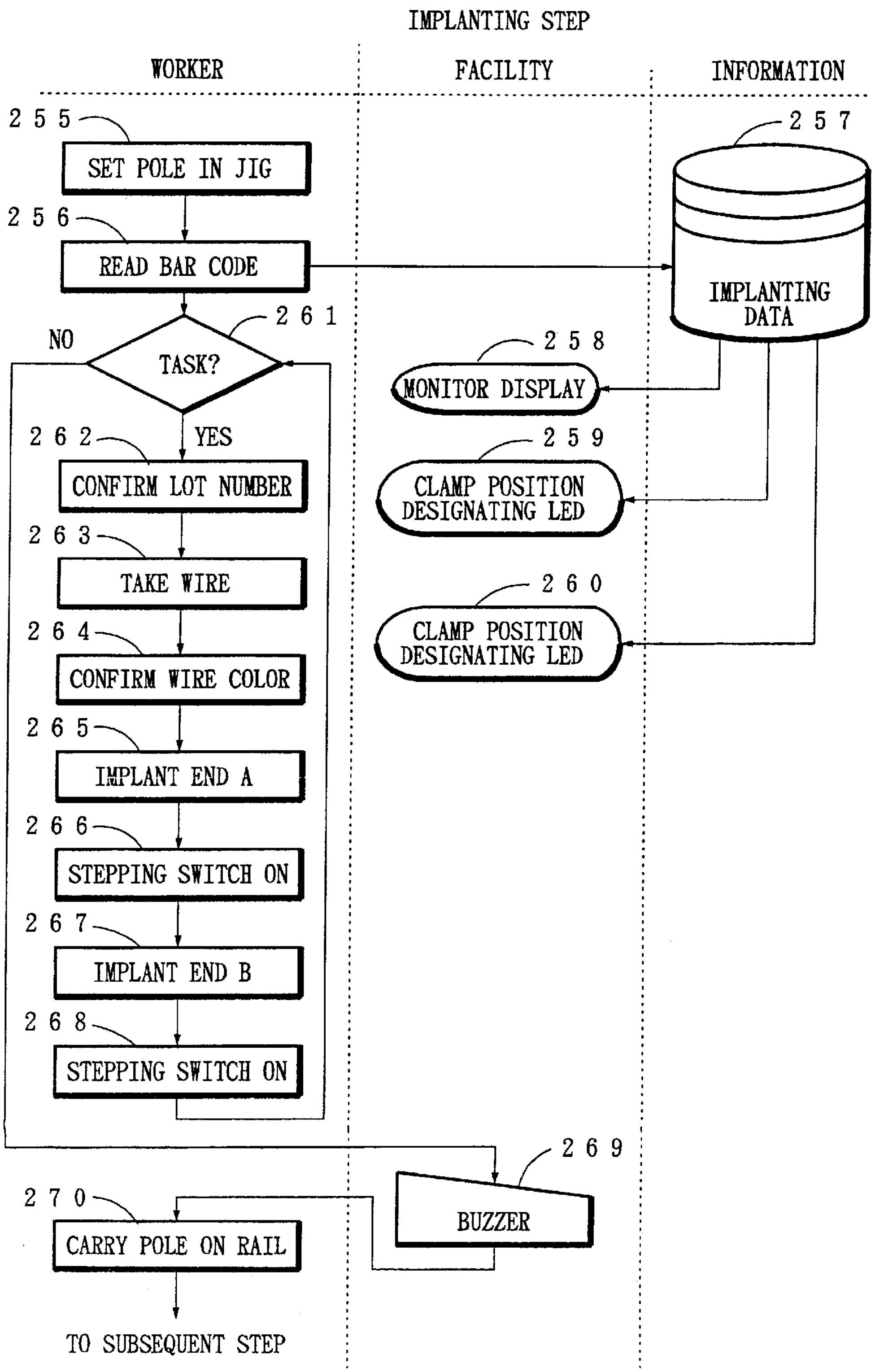
FIG. 19 is a flowchart of a wire shooting step.

FIG. 19 shows the wire implanting step.

First, a worker sets the wire clamping pole in the wire clamp position designating jig (255), and reads the bar code of the wire clamping pole (257). Thus, the item number of the wire clamping pole is supplied to an implanting data file (257). The product number, designing number, lot number and wire color of a sub-wire harness are displayed on a monitor (258). In addition, the clamp number signals indicative of the positions where both ends of the wire are to be clamped are outputted sequentially by the operation of the stepping switch so that the LED's of the two clamps of the wire clamp position designating jig illuminate sequentially (259, 260).

The worker confirms the presence of a task (261), and confirms the lot number from the display of the monitor (262). He takes out the special wire such as a twisted wire and a shielded wire from the wire stocker (263). He confirms the wire color in comparison with the displayed color (264). Thereafter, he implants the one terminal (terminal A) of the wire in the clamp on the side of the one illuminated LED in the wire clamp position designating jig (265). By turning on the stepping switch (266), he implants the other terminal (terminal B) of the wire in the clamp on the side of the other illuminated LED in the wire clamp position designating jig (267). The terminal A is located on the forward side within the wire stocker. After implanting, he turns on the stepping switch (269) to confirm the presence or absence of a task. If no task is present, the buzzer sounds (269). He carries the wire clamping pole on the shifting rail (270) and shifts it to the subsequent step (terminal crimping step).

Figure 20:
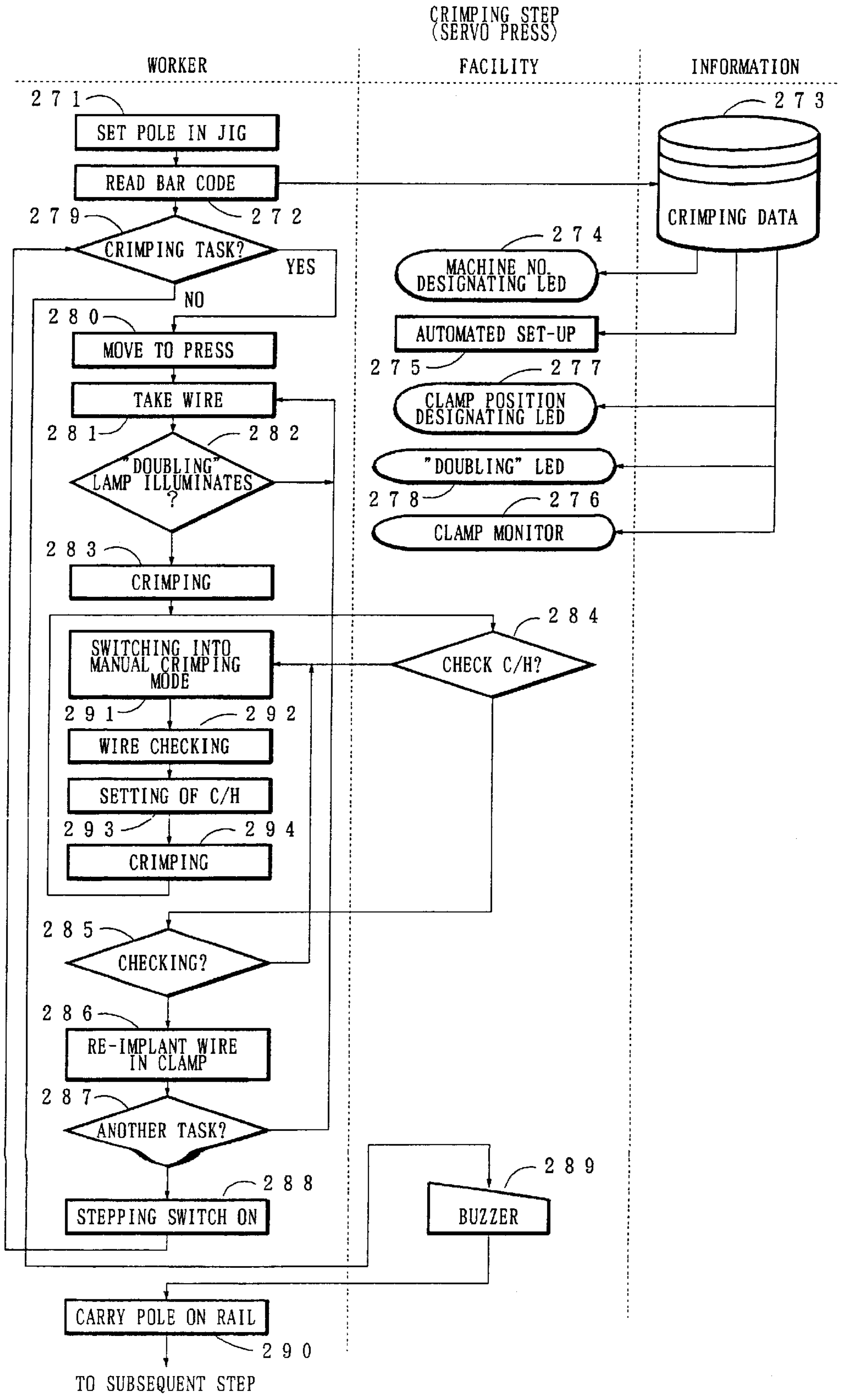
FIG. 20 is a flowchart of a terminal crimping step using a servo press.

FIG. 20 shows the terminal crimping step using a servo press.

First, a worker sets the wire clamping pole in the wire clamp position designating jig (271), and reads the bar code of the wire clamping pole (272). Thus, the number of the wire clamping pole is supplied to a terminal crimping data file (273). The signal indicative of the machine number of the servo press is outputted from the crimping data file to illuminate the LED of a required servo press (274). A plurality of servo presses are arranged.

Simultaneously, the crimping data signal designating the terminal product number, wire size, crimp height is outputted from the crimping data file so that the servo press is automatically prepared (275). Specifically, the servo motor is operated so that the descending stroke of the upper die of the crimping jig is automatically adjusted. The crimping data are displayed on the monitor (276). The clamp number signal of the wire clamping pole is outputted to illuminate the corresponding LED (277). Further, another LED indicative of "double-crimping", i.e. the case where two wires superposed with each other are crimped illuminates in the wire clamp position designating jig (278).

The worker recognizes the presence or absence of the crimping operation (279), and moves to the servo press designated by the LED (280). He takes out the wire from the clamp designated by the LED of the wire clamping pole on the moving cart (281). He confirms whether the LED indicative of the double-crimping illuminates or not. If it is not, the terminal is crimped on the wire (283). The crimp height is checked automatically (284) to check the crimping state automatically or visually. If the checking result is OK, he implants the terminal-equipped wire in the clamp in the wire clamping pole designated by the LED (286). If the subsequent task is present, the above cycle is repeated. If it is not, he turns on the stepping switch (288) to confirm whether the crimping operation is present or absent (279). If it is absent, he confirms a finish buzzer (289). He carries the wire clamping pole on the shifting rail (290) and shifts it to the subsequent step. The shifting cart is placed for each of the steps.

If the checking result of the crimping height is not to standard (284), for example, he switches the servo press into a manual crimping mode (291). In this mode, the wire terminal processing such as peeling is carried out referring to a crimping standard table. The crimp height is adjusted (293) and the crimping is effected (294). Such a re-crimping operation may be carried out after a series of crimping operations have been completed.

Figure 21:
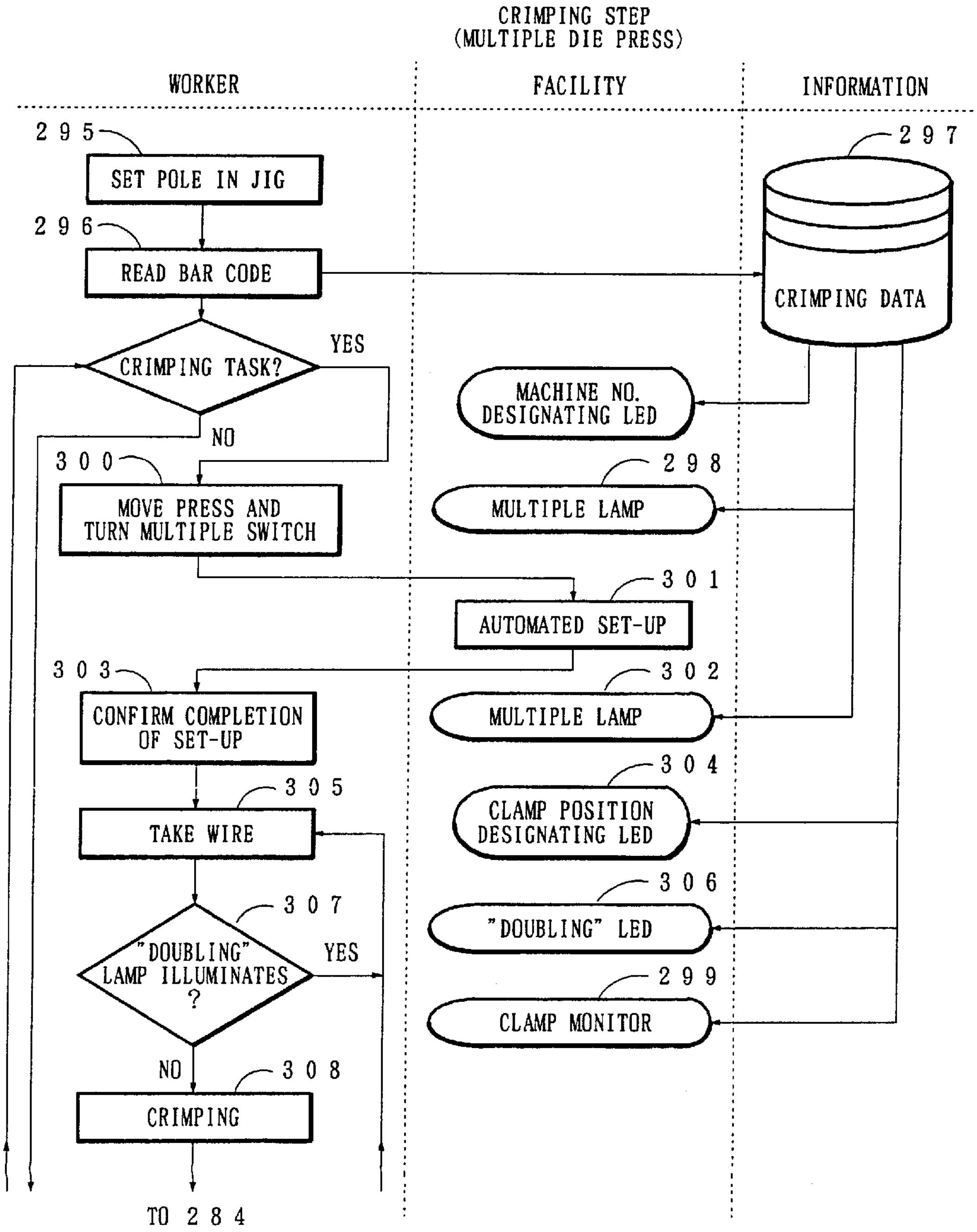
FIG. 21 is a flowchart of a terminal crimping step using a multiple-die press.

FIG. 21 shows a terminal crimping step using a multiple die press (FIG. 11).

This step is basically the same as the terminal crimping step using the servo press.

First, a worker sets the wire clamping pole in the wire clamp position designating jig (295), and reads the bar code of the wire clamping pole (296). Thus, the number of the wire clamping pole is supplied to a terminal crimping data file (297). At the same time,the crimping data signal designating the terminal product number, wire product number, wire size, crimp height is outputted from the crimping data file.

The worker shifts the wire clamping jig to the multiple die press with the LED illuminated (300) and turns on the switch. Then, the lamp of a required multiple die press blinks (298), and the multiple die press is automatically placed on the basis of the crimping data. When the set-up or placement is completed, the lamp illuminates (302). Thus, completion of the placement is confirmed (303). When the signal of the clamp number is outputted from the terminal crimping data file (297), the LED of the required clamp in the clamp position designating jig illuminates (304). The worker takes the wire from the clamp (305), and confirms that the lamp for double-crimping does not illuminate (306, 307). Thereafter, the terminal crimping will be carried out. The subsequent process, which is the same as the case of using the servo press, will not be explained nor illustrated.

Figure 22:
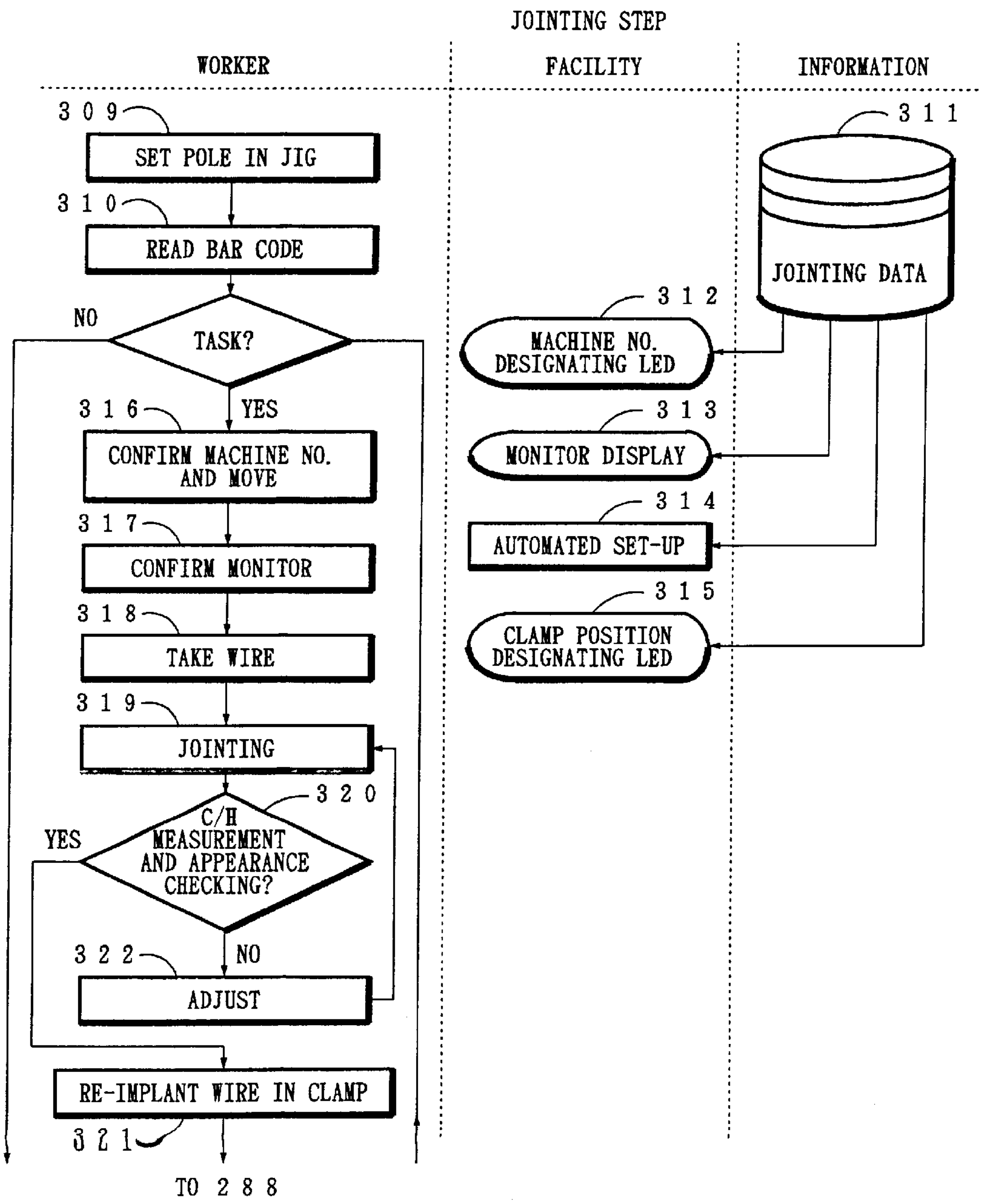
FIG. 22 is a flowchart of a wire jointing step.

FIG. 22 shows the wire jointing step.

This step is also generally the same as the crimping step described above.

First, a worker sets the wire clamping pole in the wire clamp position designating jig (309), and reads the bar code of the wire clamping pole(310). Thus, the item number of the wire clamping pole is supplied to a joint data file (311). The LED indicative of the required jointing machine (servo press) illuminates (312). At the same time, the jointing data signal designating the wire product number, wire size, jointing position, jointing direction, presence/absence of soldering, clamp number, etc. are outputted from the joint data file, and displayed on a joint monitor (313). Further, the servo press is automatically placed on the basis of the joint data, and the LED in the wire clamp position designating jig illuminates (315). The LED's for the two wires to be jointed in FIGS. 14E and 14F illuminate.

The worker moves to the machine (servo press) designated by the LED (316) and sees the monitor (317). He takes the wires from the clamps with the LED's illuminated, and joints these wires using the servo press. The measurement of the crimping height and appearance checking are automatically used (320). If the checking result is OK, the worker re-implants these wires in the initial clamps (321). The subsequent process, which is the same as the crimping step, will not be explained nor illustrated. If the checking result is NG, he adjusts the servo press (322). He effects the jointing again, for example by replacing the terminal by a new terminal.

Figure 23:
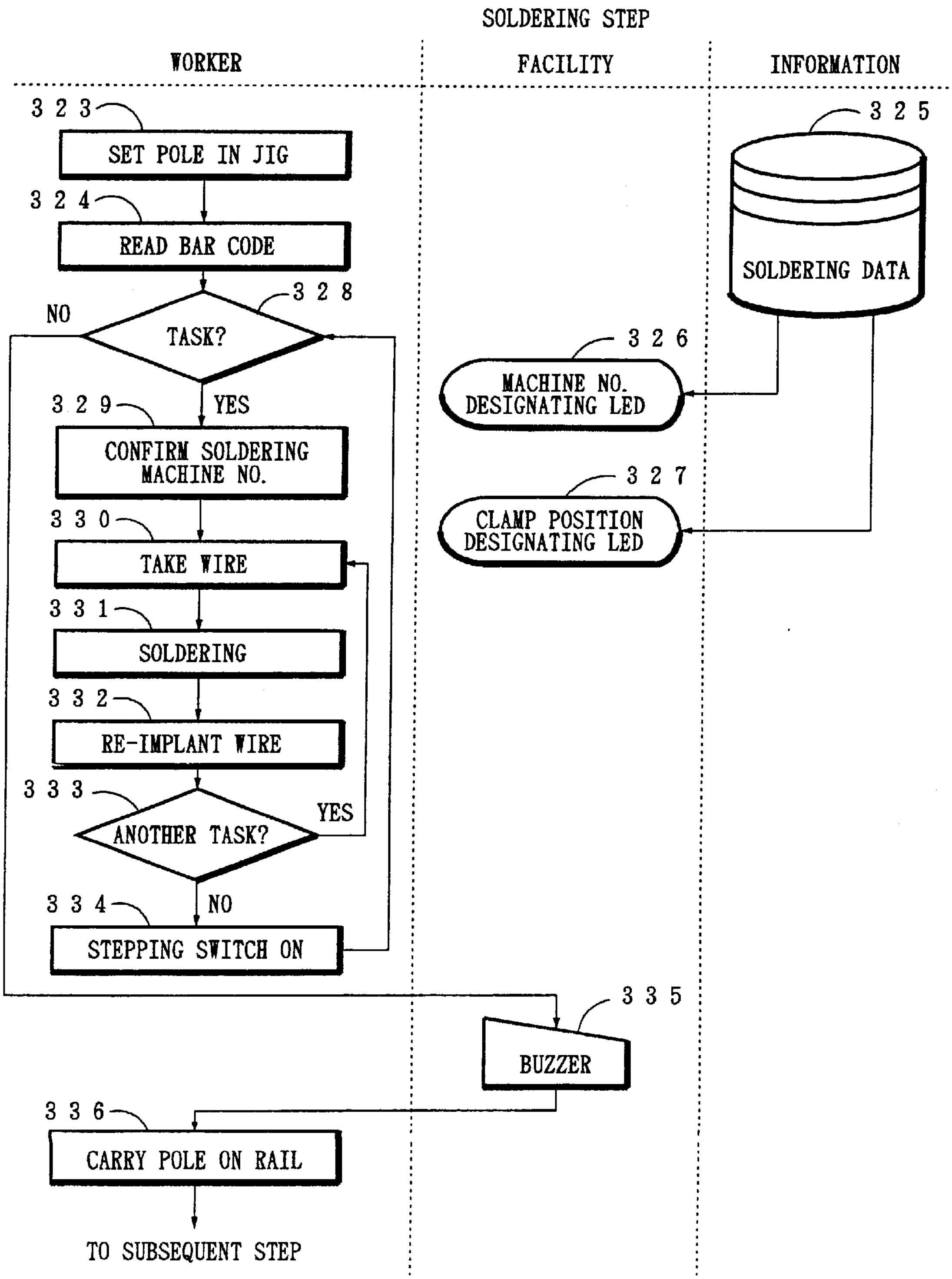
FIG. 23 is a flowchart of a soldering step.

FIG. 23 shows the soldering step.

First, a worker sets the wire clamping pole in the wire clamp position designating jig (323), and reads the bar code of the wire clamping pole (324). Thus, the number of the wire clamping pole is supplied to a soldering data file (325). Thus, the number of the wire clamping pole is supplied to a soldering data file (325). The LED indicative of the required soldering machine illuminates (326). The LED of the wire clamp position designating jig illuminates (327) to designate the clamping position.

The worker recognizes the presence or absence of task (328) and the machine number of the soldering machine to be used. He takes the terminal-equipped wire from the clamp with the LED illuminated (330), and makes the soldering for reinforcement at a terminal crimping portion or jointing portion (331). Upon completion of the soldering, he re-implants the wire into the initial clamp with the LED illuminated (332). He confirms the presence or absence of the subsequent task (333), and turns on a stepping switch (334). When the completion buzzer (335) sounds, he carries the wire clamping pole on the rail (336) and send it to the subsequent step.

Figure 24:
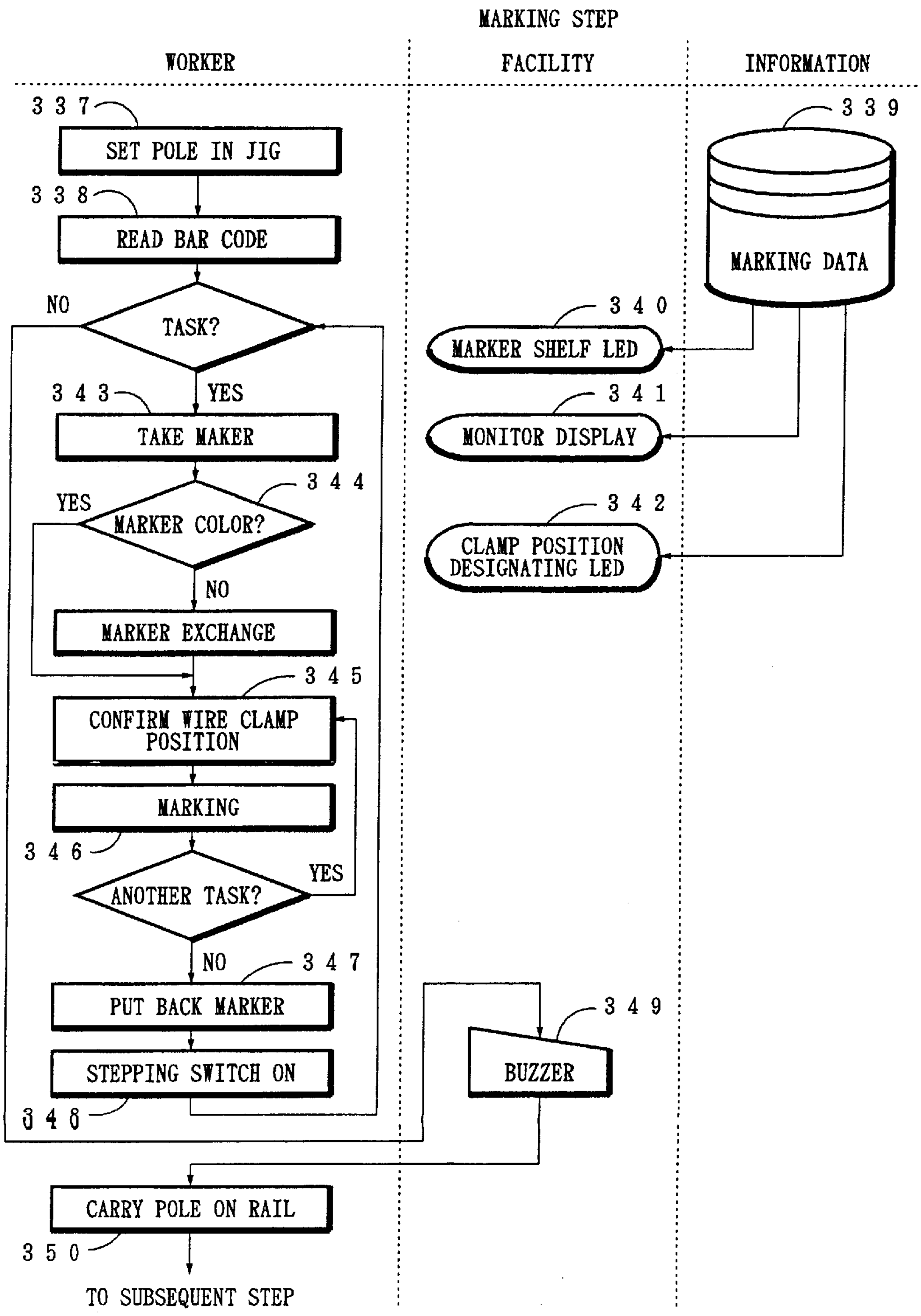
FIG. 24 is a flowchart of a marking step.

FIG. 24 shows the marking step.

First, a worker sets the wire clamping pole in the wire clamp position designating jig (337), and reads the bar code of the wire clamping pole (338). Thus, the number of the wire clamping pole is supplied to a marking data file (339). The marking address signal is outputted from the marking data file to illuminate the LED indicative of the required marking on a marking shelf (340). Further, the product number and marking color of the sub-wire harness are displayed on a monitor (341). The LED of the wire clamp position designating jig illuminates (342) to designate a required terminal-equipped wire.

The worker recognizes the LED of the marker shelf and takes a marker with the LED illuminated. After he confirms coincidence between its color and the marking color displayed on the monitor (344), he makes a marking on the terminal-equipped wirewith the LED illuminated (345, 346). The worker returns the marker to its initial position (marker shelf with the LED emitted), and turns on a stepping switch (348). When the completion buzzer (349) sounds, he carries the wire clamping pole on the rail (350) and sends it to the subsequent step.

Figure 25:
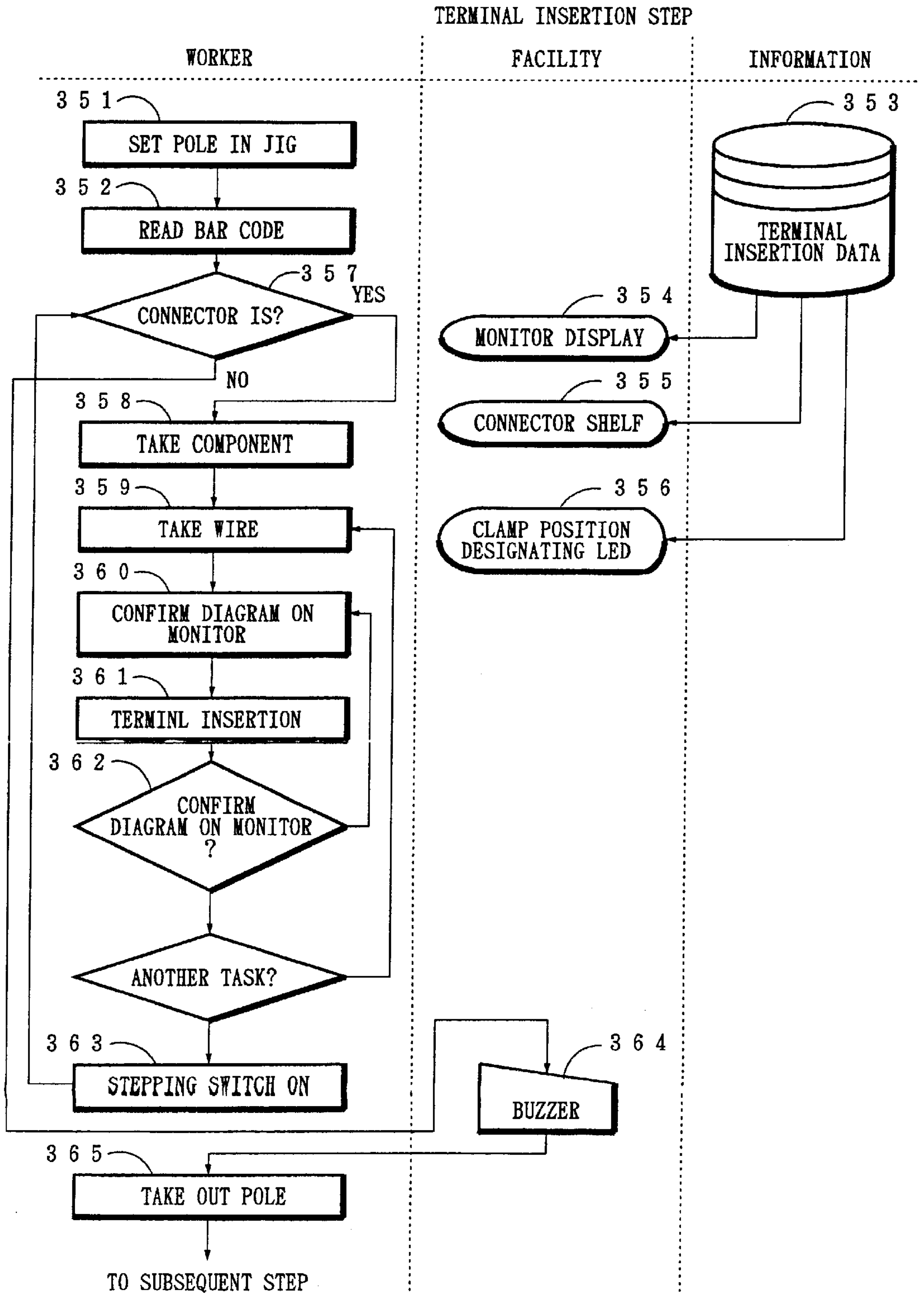
FIG. 25 is a flowchart of a terminal inserting step.

FIG. 25 shows the terminal insertion step.

First, a worker sets the wire clamping pole in the wire clamp position designating jig (351), and reads the bar code of the wire clamping pole (352). Thus, the number of the wire clamping pole is supplied to an terminal insertion data file (353). A terminal insertion position signal is outputted from the data file so that the monitor displays the item number of a connector housing and wire color, and displays a diagram indicative of the terminal chamber of the connector housing into which the terminal is to be inserted (e.g. a single terminal chamber of the connector housing blinks) (354). A connector housing designating signal indicative of the connector housing to be used is outputted to illuminate the LED of the connector shelf (component stocker) (355). A clamp position designating signal is outputted to illuminate the LED of the wire clamp position designating jig (356).

From the illuminated LED, the worker confirms the presence of the connector housing into which a terminal is to be inserted (357), and takes out the connector housing designated by the LED from the connector shelf (358). The worker takes out the terminal-equipped wire from the clamp designated by the LED in the wire clamp position designating jig (359). From the diagram displayed on the monitor, he confirms the position of a terminal chamber into which the terminal is to be inserted and the wire color, and inserts the terminal into the designated terminal chamber in the connector housing (361). He confirms correctness of the actually inserted terminal in comparison to the diagram displayed on the monitor (362), and carries out the subsequent terminal insertion operation. When he has inserted all the terminals into the terminal chambers, the sub-wire harness is completed. He turns on the stepping switch (363) to confirm the completion buzzer (364). The worker takes out the wire clamping pole from the wire clamp position designating jig (365), and sends the wire clamping pole with the sub-wire harness being hung on to the subsequent wire harness board step.

The operation procedure in the wire harness manufacturing system according to the present invention was described hitherto.

This system, i.e. FSP (Flexible Synchronous Production) system can be summarized as follows.

(1) The preparation step (from the wire cutting to terminal insertion) is carried out with a set of a wire clamping pole on a line. An ID, namely a bar code seal is pasted on the wire clamping pole. While the ID is being read in each step, data necessary for processing are taken.

(2) The facility in each step is controlled so that the tooling change and main operations are effected automatically.

In the cutting step, using the automated cutting machine (CS50) having a 120 wire color changing device, the operations of wire changing, cutting, middle-peeling and wire implanting in a wire clamping pole may be automatically carried out. In the peeling step, peeling of both ends of the wire is automatically carried out by a pole-setting peeling machine. In the crimping/jointing step, exchange of the C/H (crimping height) and A/P (applicator) is carried out using the servo press or multiple die servo press.

(3) In the steps using no facility (accessory combining and terminal insertion) and subjected to communication control (crimping machine with no servo), necessary data are given to the worker at an appropriate time using a personal computer, monitor and LED.

(4) The data necessary for manufacturing are automatically created on the basis of the CAE (Computer Aided Engineering) and data base for each factory (or each step).

In accordance with the system, as shown in FIG. 26, the operations can be simplified greatly in comparison to the ordinary OES (Order Entry System) (FIG. 27). Specifically, in the preparation step, the operations of outputting of the instruction card, needle-threading for the instruction card, assorting of the instruction cards can be excluded. In the cutting step, the operations of wire assorting and peeling set-up can be excluded. In the accessory combining step, the operation of assorting can be excluded. In the terminal crimping step, the operations of assorting and A/P set-up can be excluded. In the jointing step, the operations of joint assorting, joint middle-peeling and A/P set-up can be excluded. Further, the assorting step can be excluded.

More specifically, (1) the manufacturing instruction data for each step are directly supplied to the facility, thus requiring no instruction sheet. This is attributable to use of an information terminal device. (2) Improvement of data transfer to the facility and function of the facility excludes necessity of set-up and human errors. (3) Shifting from the batch production to the set (cycle) production excludes the assorting and intermediate stock. This shortens the lead time in total. Namely, the automatic set-up through the data communication reduces an operation error, the reduction of the attendant operation improves the efficiency, and the production by a firm order is permitted so that the locked up items are reduced.

What is claimed is:

1. A wire harness manufacturing system which issue a working instruction for manufacturing a wire harness to a worker using a network composed of an upstream network and a downstream network, comprising:

a plurality of wire clamping poles each having a plurality of wire clamps;

a jig having a designating portion corresponding to each clamp;

a first computer managing data necessary to manufacture wire harnesses;

a second computer supplying the data received from the first computer with several kinds of designation data to create an operation instruction file;

a third computer checking the operation instruction file against a master file to create a data file available for all manufacturing steps;

a fourth computer allotting file data processed by the third computer to each wire clamping pole, a plurality of servers supplying the file data to the downstream network;

a plurality of information terminal devices which are connected to the servers to requite data necessary for actual operations and provide each designation signal to said designating portion; and a scanner connected to each of said information terminal devices, for supplying the number of the clamping pole to a certain information terminal device, wherein said first, second, third and fourth computers are connected to said server through a bus line and constitute said upstream network.

2. A wire harness manufacturing system according to claim 1, wherein a predetermined accessory in an accessory shelf and a predetermined wire in a wire stocker are designated by an output signal from one of said information terminal devices.

3. A wire harness manufacturing system according to claim 1, wherein a predetermined terminal crimping machine or joint terminal machine are designated and automatically set up by one of said information terminal devices.

4. A wire harness manufacturing system according to claim 1, wherein a predetermined connector housing in a connector shelf is designated and a terminal insertion position of the connector housing is designated by an output signal from one of said information terminal devices.

5. A wire harness manufacturing system according to claim 1, further comprising an automated wire cutting machine which is controlled by a first personal computer, wherein said personal computer is supplied with said data and an identifying number of said wire clamping pole from the scanner.

6. A wire harness manufacturing system according to claim 1, further comprising an automated peeling machine which is controlled by a second personal computer, wherein said second personal computer is supplied with said data and an identifying number of said wire clamping pole from the scanner.

7. A wire harness manufacturing system according to claim 1, wherein said wire clamp position designating jig, each information terminal device and scanner are loaded on a moving cart which is movable in each of steps of the wire harness manufacturing system.

8. A wire harness manufacturing system according to claim 1, wherein said designation data comprise clamp position data.

* * * * *